(No Model.)
10 Sheets—Sheet 1.
H. T. SUNDSTROM.
MACHINE FOR SEALING NEWSPAPERS.
No. 603,458.
Patented May 3, 1898.
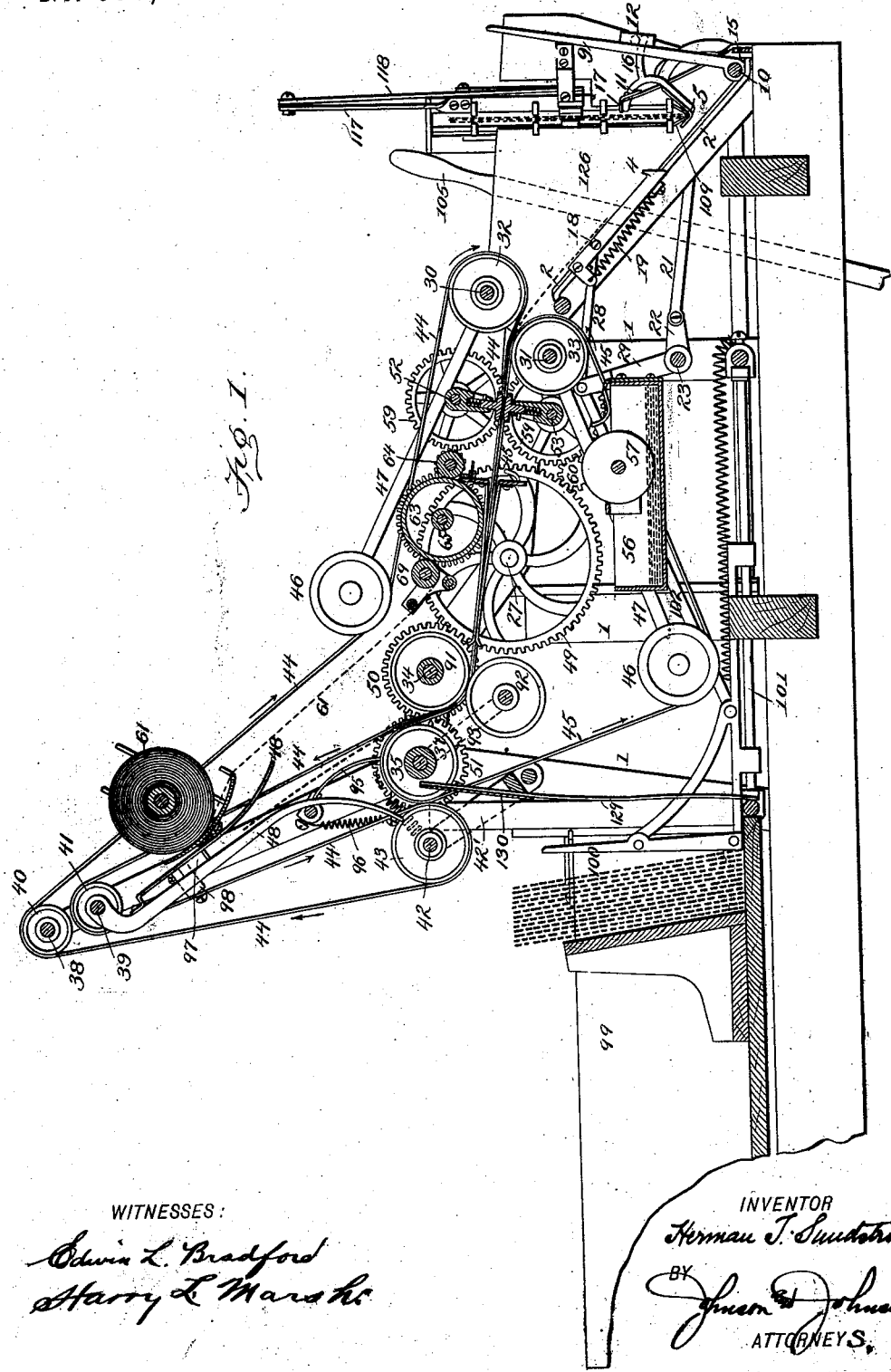
WITNESSES:
Edwin L. Bradford
Harry L. Marshe
INVENTOR
Herman T. Sundstrom,
BY Johnson and Johnson
ATTORNEYS.

(No Model.)
10 Sheets—Sheet 2.
H. T. SUNDSTROM.
MACHINE FOR SEALING NEWSPAPERS.
No. 603,458.
Patented May 3, 1898.
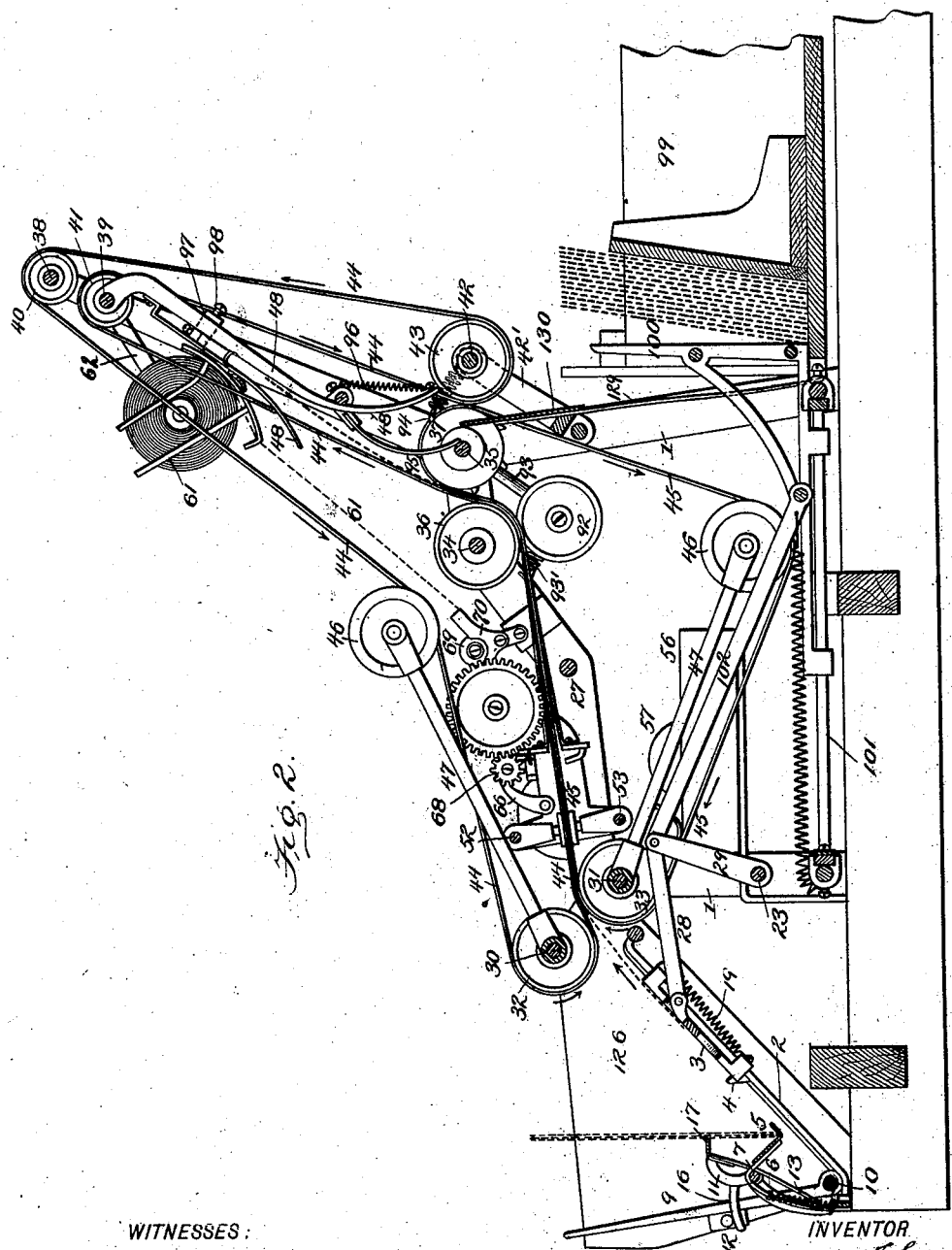
WITNESSES:
Edwin L. Bradford
R. H. McPherson Jr.
INVENTOR
Herman T. Sundstrom
BY
Johnson and Johnson
ATTORNEYS.

(No Model.) 10 Sheets—Sheet 3.
H. T. SUNDSTROM.
MACHINE FOR SEALING NEWSPAPERS.
No. 603,458. Patented May 3, 1898.
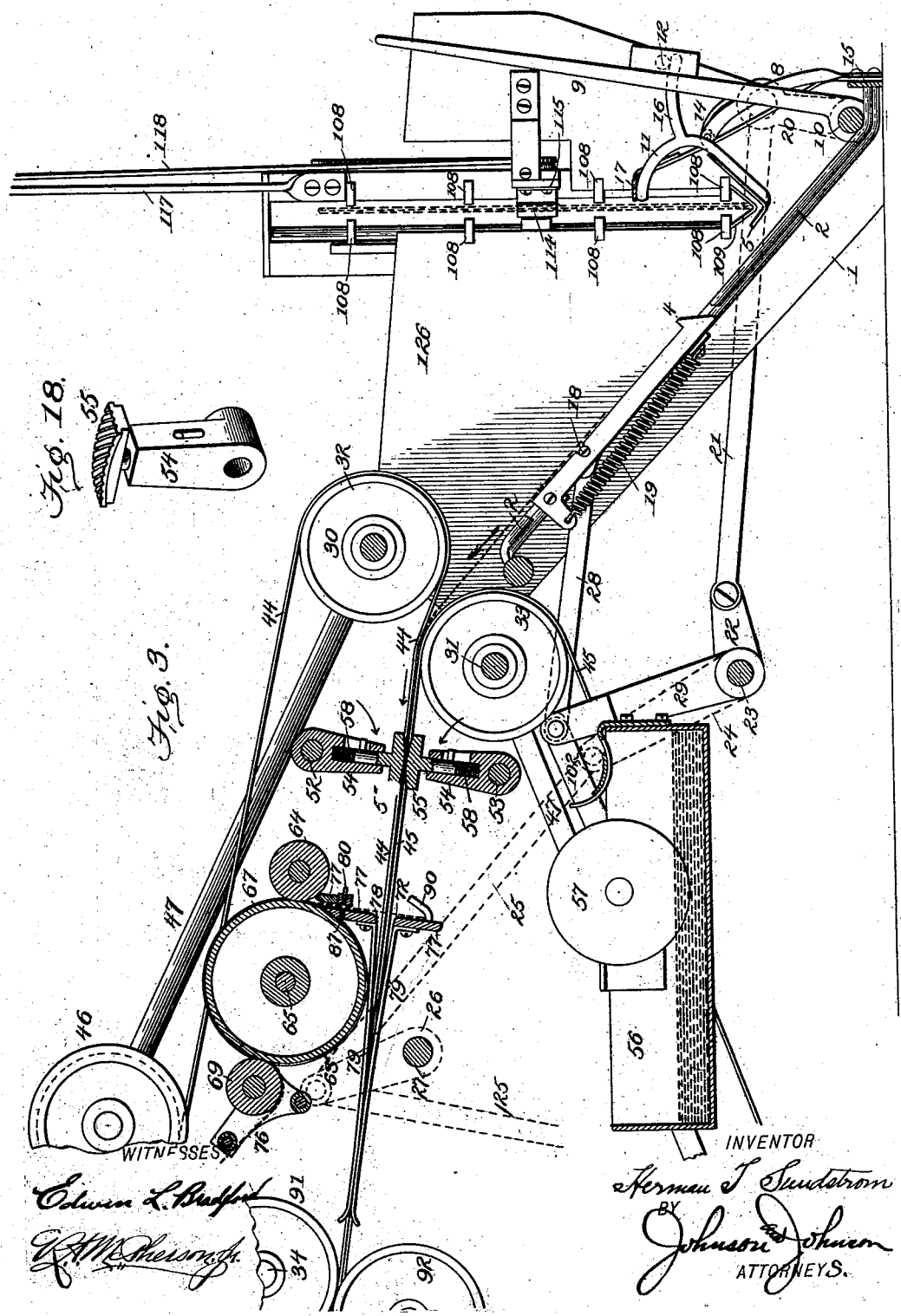

(No Model.)
10 Sheets—Sheet 4.
H. T. SUNDSTROM.
MACHINE FOR SEALING NEWSPAPERS.
No. 603,458.
Patented May 3, 1898.
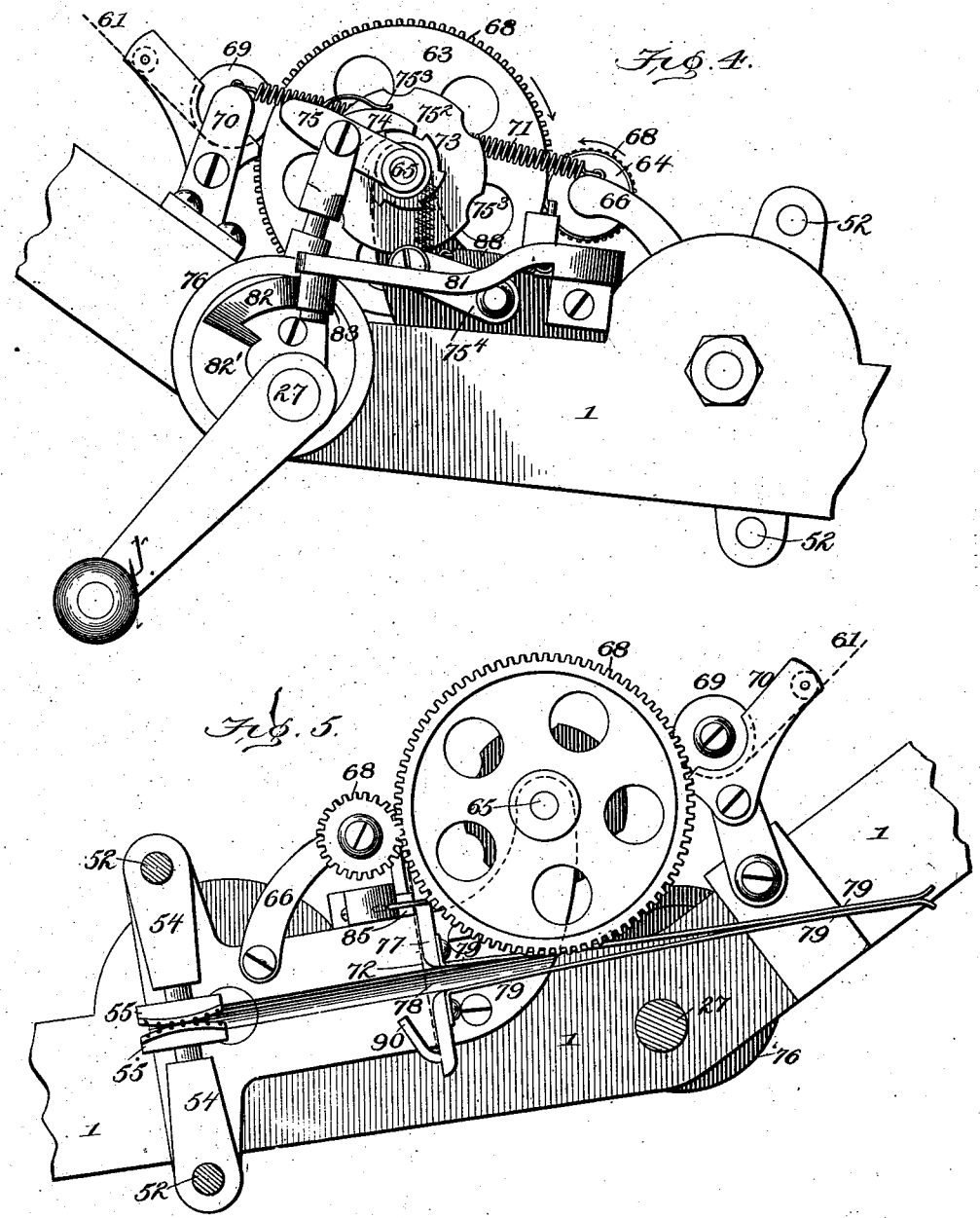
WITNESSES:
Edwin L. Bradford
R. H. McPherson Jr.
INVENTOR
Herman T. Sundstrom
BY
Johnson and Johnson
ATTORNEY.

(No Model.) 10 Sheets—Sheet 5.
H. T. SUNDSTROM.
MACHINE FOR SEALING NEWSPAPERS.
No. 603,458. Patented May 3, 1898.
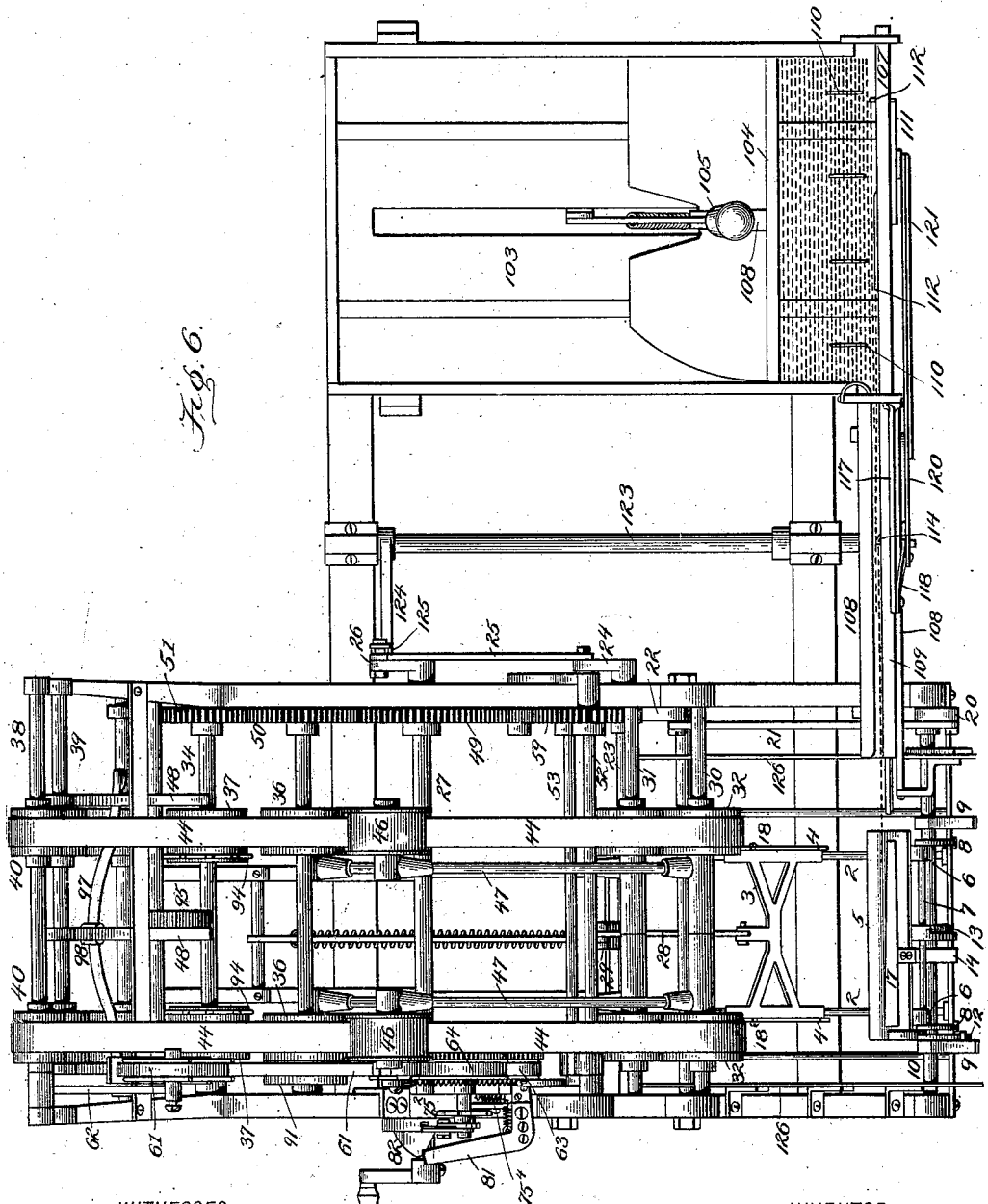

(No Model.) 10 Sheets—Sheet 6.
H. T. SUNDSTROM.
MACHINE FOR SEALING NEWSPAPERS.
No. 603,458. Patented May 3, 1898.
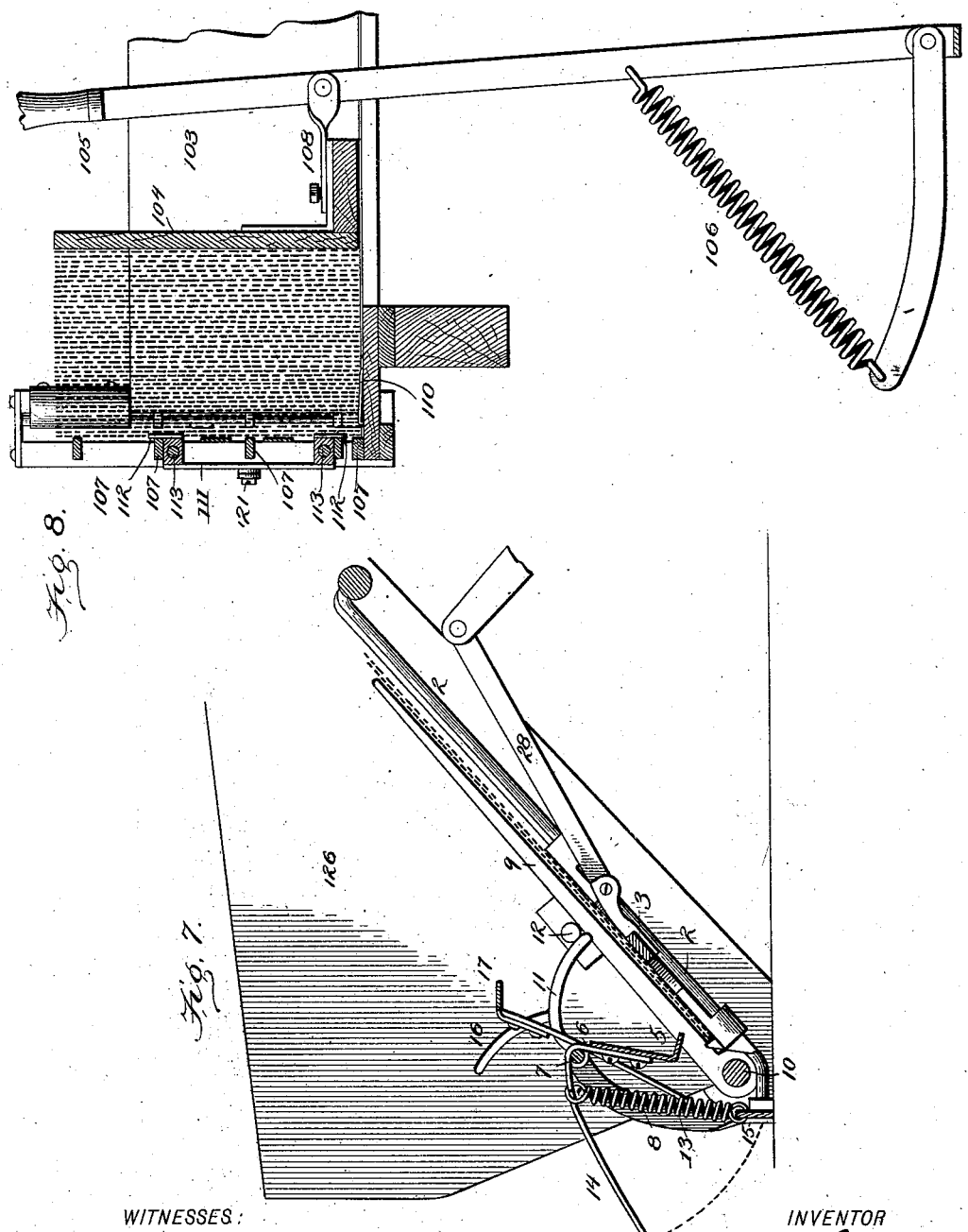
WITNESSES:
Edwin L. Bradford
R. H. McPherson Jr.
INVENTOR
Herman T. Sundstrom
BY
Johnson and Johnson
ATTORNEYS.

(No Model.) 10 Sheets—Sheet 7.
H. T. SUNDSTROM.
MACHINE FOR SEALING NEWSPAPERS.
No. 603,458. Patented May 3, 1898.
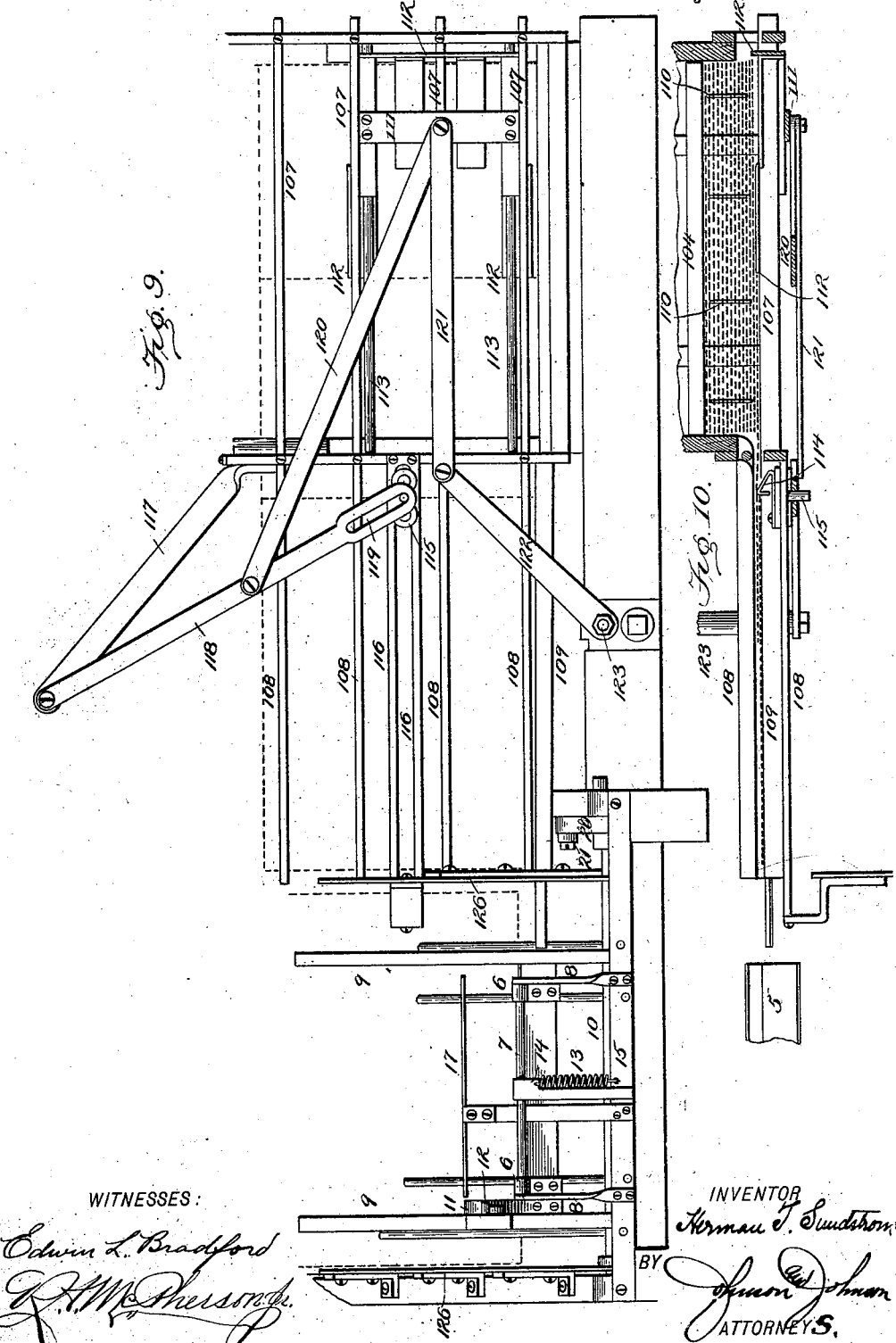
WITNESSES:
Edwin L. Bradford
R. H. McPherson Jr.
INVENTOR
Herman T. Sundstrom
BY
Johnson & Johnson
ATTORNEYS.

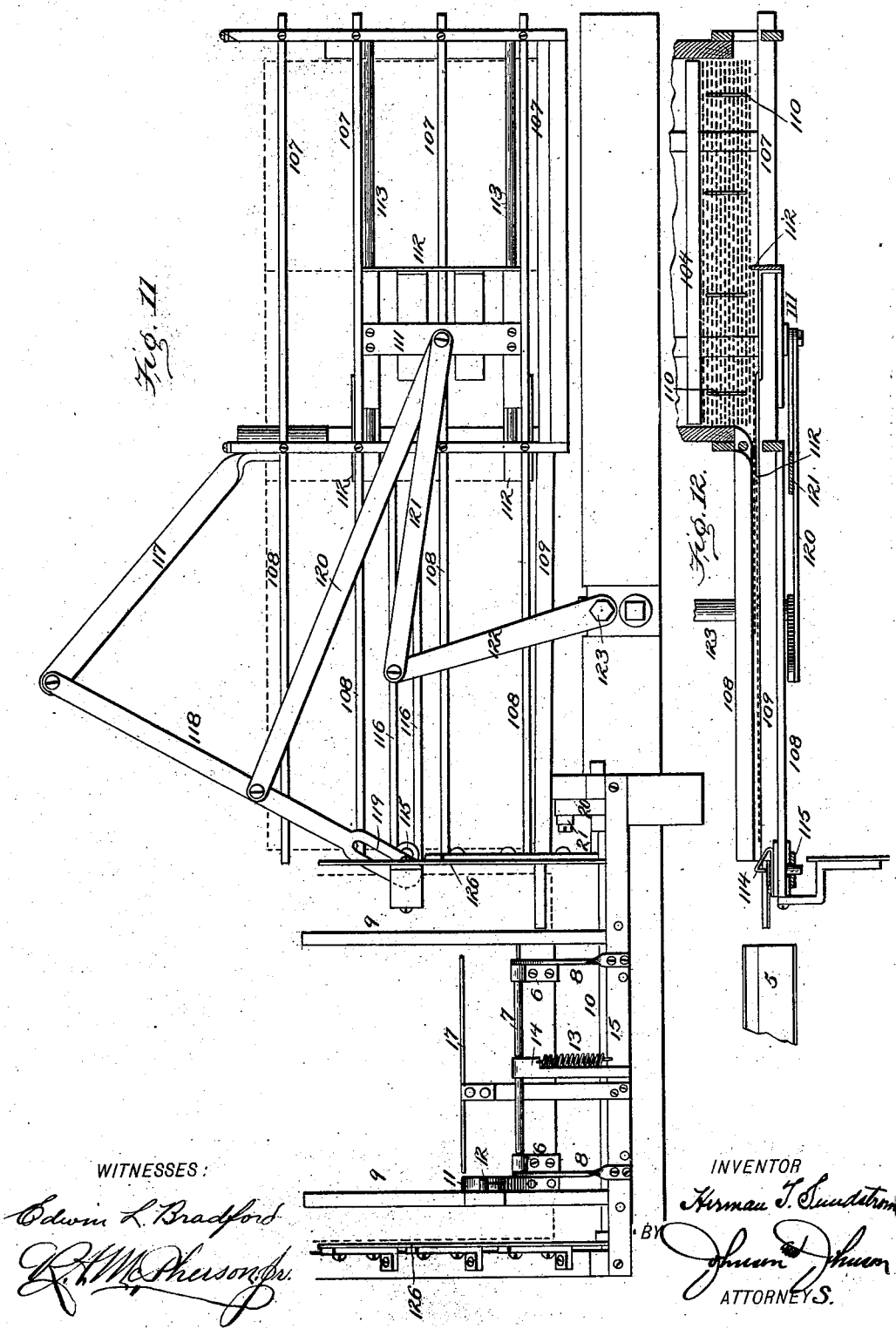

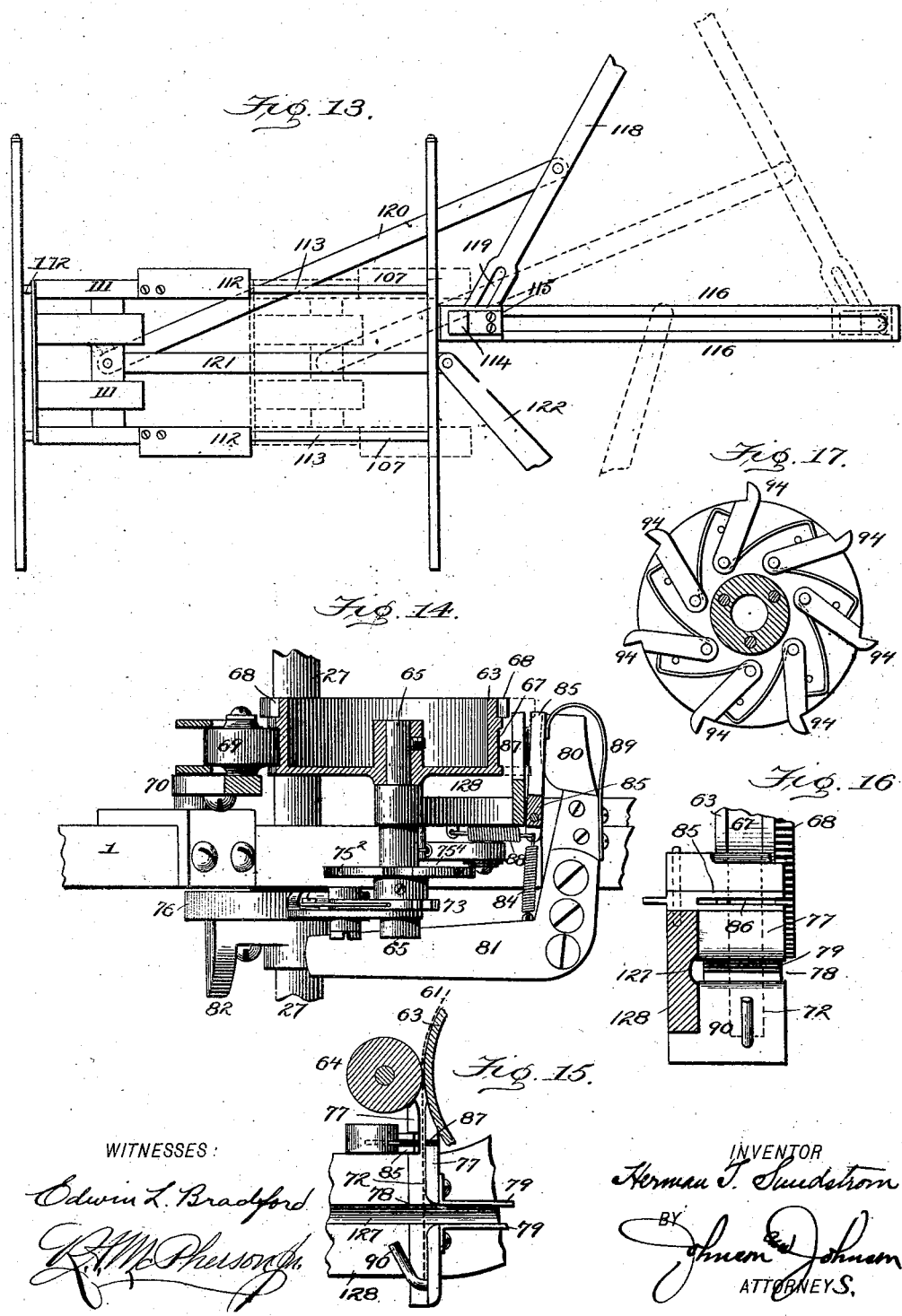

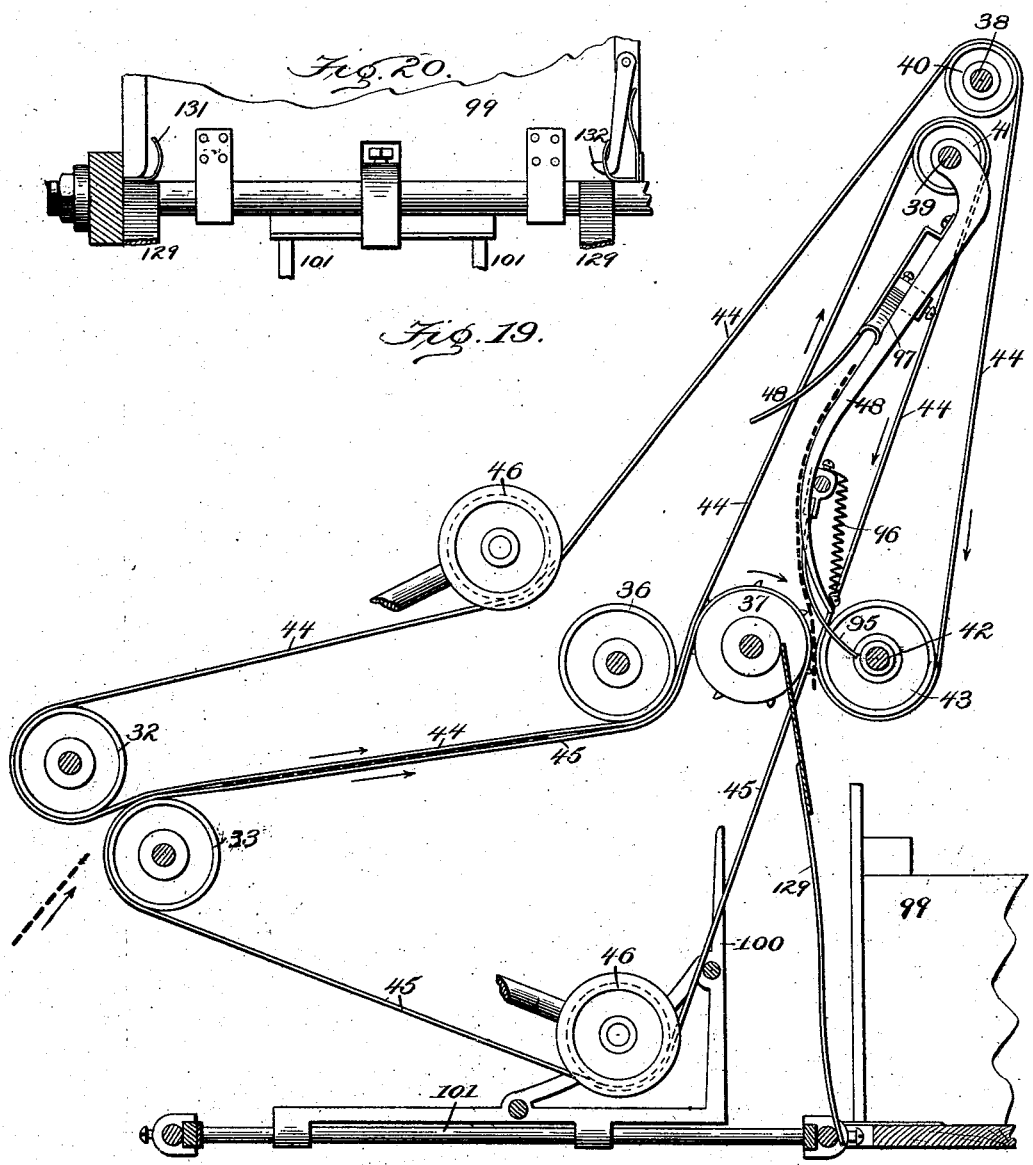

UNITED STATES PATENT OFFICE.

HERMAN T. SUNDSTROM, OF GALVESTON, TEXAS.

MACHINE FOR SEALING NEWSPAPERS.

SPECIFICATION forming part of Letters Patent No. 603,458, dated May 3, 1898.

Application filed June 10, 1897. Serial No. 640,129. (No model.)

*To all whom it may concern:*

Be it known that I, HERMAN T. SUNDSTROM, a citizen of the United States, residing at Galveston, in the county of Galveston and State of Texas, have invented certain new and useful Improvements in Machines for Sealing Newspapers, &c., of which the following is a specification.

In the sale of newspapers from the publishing-house it is usually the understanding with news dealers and agents that papers unsold and returned by them to the publishers within a certain time will be redeemed. It cannot be told, however, whether the papers, or many of them, so returned have not been read and even sold and afterward gathered up by the dealer.

The object of my machine is to seal the folded newspaper at its open or free edges, so that it cannot be read without breaking the seal and thereby making it non-redeemable.

In such machine my invention consists in certain novel parts and combinations of parts which are made the subject of my claims.

The machine illustrated in the accompanying drawings is especially adapted for sealing the edges of folded newspapers; but it will be understood that the invention may be embodied in machines for sealing magazines and like publications in different ways by substantially the same means. In describing the pasting and sealing mechanism, however, I shall refer to the articles to be sealed as the "paper."

The principle upon which the machine embodying my present invention operates is that of first advancing the folded paper to a device by which the paste is applied to both sides at once of the paper, at its open or free edges, and preferably while advancing, then applying an unpasted sealing-strip to the pasted sides of the paper under pressure sufficient to lay the ends of the sealing-strip, and subsequently applying greater pressure to said strip and paper to complete the sealing as the paper is advanced through the machine. In these several steps the distinctive features of my invention are directed to pasting the paper itself on both sides of its edges; to supporting the sealing-strip at its lower hanging end in free position upon a rest, from which it is taken by the advance of the paper; the advance of the paper to the pasting and sealing devices and through the machine between endless traveling belts, which are adapted to receive the paper in advance of the pasting device, support it while being pasted, while having the sealing-strip applied thereto, and while being delivered from the machine; the employment of continuously-rotating pasters which act conjointly, whereby one receives paste and transfers it to the other, and both transfer it to the opposite sides of the paper in their rotation in the direction of the travel of the paper; the employment of a tilting ledge or shelf on which the paper is received and from which it is automatically transferred to a reciprocating slide by which the paper is advanced to the endless traveling belts; in an arrangement of the belts whereby the paper is carried from the sealing devices upward between fixed guide-fingers, reversed in its movement, and delivered downward into a packing-box. In this operation the direction and movement of the paper is guided and controlled by the endless belts, which are so disposed as to affect the course of the paper so that the surfaces of the pasters will meet just as the edge of the paper will be carried between the pasters.

The invention may be embodied in machines of different forms to suit different work and different methods of feeding the articles to be sealed; but I prefer to use a feed mechanism by which the folded papers are supported upon their folded edges in a pile and fed edgewise vertically from said pile upon the tilting ledge or shelf, from which it is turned down flatwise upon the sealing-machine out of the path of the succeeding paper. As I have designed it, the feed device is for occasions where it is necessary to fill the feed-box by hand to maintain a pile from which the feed is automatic. This is more convenient than to have the papers delivered to the sealing-machine direct from the press, because many newspaper-offices do not use the high-speed presses, but use what are termed "cylinder-presses" with a capacity of from eight hundred to two thousand impressions per hour. The feed device can also be applied to foot or job presses for printing envelops and postal cards.

Where a web-press is used, the feed device is not necessary, and the sealing-machine can be placed in direct connection with the press and will receive and seal the papers at the same rate of speed at which the press may be running.

The following description, read in connection with the accompanying drawings, will enable any person skilled in the art to which my invention relates to understand and to practice it; but it will be understood that my invention is not limited to the precise form illustrated and described, as various modifications may be made without departing from its essential novelty or sacrificing any of the advantages of my invention.

Referring to the drawings, Figure 1 represents in vertical longitudinal section my improved sealing-machine, the section being taken in the line of the path of the sealing-ribbon and showing the course of the paper to be sealed. Fig. 2 is an identical section, but looking from the opposite side of the machine. Fig. 3 is a similar section, enlarged, of so much of the machine as illustrates the advance of the paper to the pasting and sealing mechanism. Fig. 4 shows, in enlarged side view, the feeding mechanism for the sealing-ribbon, and Fig. 5 is a like view looking at the inner side of the pasting and sealing mechanism. Fig. 6 is a top view of the machine. Fig. 7 shows in vertical section the fly in position as having tilted the paper-receiving shelf or ledge and delivered the paper therefrom upon the transferring-slide, whereby it is advanced to the belts. Fig. 8 is a vertical transverse section taken through the feeding-box from which the papers are fed from a pile. Fig. 9 is a front view of the machine, showing particularly the paper-feed mechanism; and Fig. 10 is a horizontal section of the paper-feed mechanism. Fig. 11 is a front view of the machine, showing the paper-feed mechanism in a different position; and Fig. 12 is a horizontal section of the same. Fig. 13 shows the feed-slides and the guideways therefor, looking at the inner side. Fig. 14 is a horizontal section of the feed device for the ribbon, particularly showing the clamp for the ribbon and the severing-knife. Fig. 15 is a detail sectional side view showing the ribbon-feed rolls and the sealing-strip fed down upon the rest which supports the sealing-strip when severed. Fig. 16 is a detail front view of the parts seen in Fig. 15. Fig. 17 shows the spring fingers or dogs for seizing the papers in the operation of reversing and delivering them. Fig. 18, Sheet 3, is one of the spring-sustained pasters; and Fig. 19 shows the arrangement and disposition of the belts and pulleys and illustrating the action of the belts in carrying out, controlling, and reversing the direction of the paper and delivering it into the packing-box; and Fig. 20 shows in top view that part of the packing-box into which the sealed sheets are dropped.

The paper as it is delivered to the machine is advanced to and seized by and between an upper and a lower set of endless traveling belts by which it is carried through the machine and delivered into a packing-box at the rear thereof. In its movement the paper is pasted on both sides to receive an unpasted sealing-strip. The operating mechanism for the movement of the paper and for pasting and sealing the paper is mounted upon a suitable frame, which, as shown, consists of vertical side frames firmly bound together upon a suitable base. At its front, between the vertical cheek-plates of the side frames, are fixed rods 2, inclining upward from the base toward the rear, and upon these rods a slide 3 is fitted to have a reciprocating movement to receive and advance the paper to the carrying-belts between said cheek-plates. The slide is a flat bed-piece on which the folded paper is laid flatwise with its open edges standing upward, and at each side the slide has a pivoted detent 4, which stands above the surface of the slide, so as to engage the folded edge of the paper and hold it and carry it up on the slide, as seen in Fig. 7. At the inclined front is mounted a tilting ledge or shelf 5, standing horizontally across the guide-rods, on which the slide is fitted, said shelf being sufficiently above the slide to allow it to be reciprocated beneath the shelf. On this shelf or ledge, which is preferably of trough form, the paper is received with its folded edge down, and the shelf is mounted to have a tilting movement toward and from the slide, as in Fig. 2 in dotted lines. The ledge or shelf is formed on a plate which is fixed to hangers 6, which are loosely hung upon a horizontal rod 7, fixed upon supports 8, rising from the base of the machine. (See Fig. 7.)

In its normal position the ledge or shelf stands to receive the paper, as in Figs. 1, 2, and 3, and when the ledge is tilted forward the paper is pushed from it upon the slide 3 above the detents 4, so that as the slide moves up the detents will catch against the edge of the paper and carry it up. The movements of the ledge or shelf and of the slide are so timed that the detents of the slide will be at the lowest limit of their movement and beneath the ledge when the latter is tilted to deliver the paper upon the slide, the upward movement of which delivers the paper to the belts, as in Fig. 7. Simultaneously with this upward movement of the slide the ledge or shelf is caused to return to its normal position to receive the next paper by means acting with a pull or press back action, as I will presently state. Coöperating with the tilting ledge or shelf is a fly 9, mounted upon a rock-rod 10 and operated to strike the paper and push it sidewise from the ledge upon the slide. For this purpose the fly is formed of fingers fixed upon a rock-rod suitably mounted at the foot of the frame, so that the normal position of the fly will be in front of the ledge or shelf, and in the forward movement of the fly its fingers will pass by each end of the ledge or shelf, as in Fig. 6, and move down at each side of the slide, thereby pushing the paper from the ledge or shelf and laying it upon the slide. This laying movement of the fly serves to simultaneously tilt the ledge or shelf to free it of the paper. The fly and the carrier are actuated by suitable connections with the main power-driven shaft, as I will presently state, while for actuating the ledge it is provided at one end with an arm 11, curved forward in position to be engaged by a stud 12 on one of the fingers of the fly and which in the laying movement of the latter bears said arm down and tilts the ledge or shelf, as in Fig. 7. A spring 13, connecting the shelf with the frame, serves to return the shelf and its actuating-arm to their normal positions during the return movement of the fly. An arm 14 on the ledge or shelf serves by contact with a fixed plate 15 to arrest said shelf at its normal position in Fig. 7. A branch 16 on the curved arm 11 may by engagement with the fly-stud 12 serve to return the shelf or ledge to its normal position, as in Fig. 2, instead of the spring, or said arm may act, in connection with the spring, to insure the certain and quick action of the ledge or shelf.

A fixed rail 17 above the shelf coöperates therewith to support the paper in position for the laying action of the fly. As the slide-detents reciprocate beneath the tilting shelf, I pivotally mount the arms of the detents and hold them by a stop 18, Fig. 3, in positions to engage the paper by springs 19, which also allow the detents to yield on coming in contact with the ledge.

The rock-rod 10 of the fly is actuated by a crank 20, Fig. 3, which by a connecting-rod 21 is actuated by a crank 22 on a rock-rod 23, mounted in the side frames back of and beneath the slide, and which rock-rod is actuated by a crank 24, which is actuated by a rod 25, connecting a crank 26 on the main power-driven shaft 27, as in Fig. 6. The slide 3 is actuated by a rod 28, which connects said slide with a crank 29 on the rock-rod 23, which actuates the fly 9, and the crank 29 of the slide-actuating shaft 23 is disposed so as to give the proper movements to both devices. The power-driven shaft 27 is mounted horizontally between the side frames, about mediately of their length, and connects and actuates all the working parts of the machine.

At the upper end of the guideway 2 for the slide 3 two shafts are fixed in the side frames, one, 30, above the other, 31, and each carry loosely-fitted pulleys 32 and 33 in such relation to each other that the pulleys 32 of the upper shaft will overhang at the front the lower pulleys 33, so that the pulleys of each shaft will form pairs between which the slide will deliver the paper.

At or near the rear end of the frame two shafts 34 and 35 are mounted to rotate; and each of these shafts carries pulleys 36 and 37, fixed thereon, which form pairs in alinement longitudinally with the front pairs of pulleys, but are arranged in horizontal relation with a space between them and preferably on a horizontal plane a little higher than the upper front pulleys. From these rear pulleys 37 the side frames rise and carry at their upper ends two fixed shafts 38 and 39, each carrying loosely-fitted pulleys 40 and 41 in longitudinal alinement with the other pulleys. At the rear of the lower rear pair of pulleys 37 is mounted a shaft 42, on which are loosely fitted pulleys 43 in longitudinal alinement with and adjacent to the rear pair of pulleys. This shaft is mounted on swing-arms 42', so that the loose pulleys 43 are constantly pressed upon the driving-pulleys 37. Upon these several pulleys endless belts 44 and 45 are arranged, preferably in two upper and two lower sets, to receive the paper from the transferring-slide, carry it to the pasting and sealing devices, and deliver it into the packing-box. For this purpose two separate endless belts are employed, so as to form an upper and an under traveling belt for each pair of pulleys. The upper belts 44 pass under the front upper pulleys 32, under the front pulleys 36 of the rear pairs, up over the top pulleys 41, down under the rear pulleys 43, and up over the highest pulleys 40 to the front pulleys. A weighted roll 46, loosely hung by an arm 47 on the front shaft 30, rests upon the upper side of each of the upper belts between the front and rear pairs of the pulleys to keep the belts 44 taut. A like weighted roll 46 on an arm 47, hung on the shaft of the lower front pulleys, rests upon and keeps the lower belt taut. This provision of weighted rolls allows the use of belts having very considerable slack, and acting upon their non-acting sides keeps them under an automatic yielding tension that is very satisfactory in preserving the uniform travel of the papers between them and insures their proper alinement with the belts in such travel.

The lower belts 45 pass over the lower front pulleys 33, between the rear pulleys 36 and 37, and over and below the rear pulleys 37 of the rear pair. This brings the lower traveling sides of the upper belts and the upper traveling sides of the lower belts in contact with each other from the front pairs of pulleys to and up between the rear pairs of pulleys, and between and in contact with these belts the paper is carried in a horizontal position to receive the paste and the sealing-strip.

In its passage between the rear pulleys 36 and 37 the paper is turned upward between fixed fingers 48, making a sort of cage, wherein the upward movement of the paper is arrested and changed to a downward movement into the packing-box by the travel of the belts. The back fingers of this cage are fixed and convex and stand back of the delivering-passage for the paper and serve to positively direct and hold the lower edge of the paper at the point where the upper and lower belts meet and seize and form the delivery-passage. Beneath and between the terminal pulleys for the upper and the lower sets of belts and at the front of the delivering-passage is a fender for directing the paper properly downward as it emerges from between the pulleys, and it will be understood that the system of belts disposed to reverse the direction of the travel of the belts is to cause the papers to be delivered with their folded edge down into the packing-box.

The power-driven shaft 27 carries a gear 49, which engages a gear 50 on the shaft of the front pulleys 36 of the rear pairs. The shafts of these rear pairs of pulleys are geared together by the gears 50 and 51 and form the drivers for the belts, the upper shaft 34 of the front pulleys 36 driving the upper belt and the rear shaft 35 of the rear pulleys 37 driving the lower belt. The gears of these two driven shafts are equal, and the gear of the power-driven shaft is sufficiently larger to give the proper speed of travel to the belts. By this arrangement of the belts the paper is seized and drawn from the transferring-slide between the belts and is supported by them as it is carried to the pasting and sealing devices. These belts also serve to change the paper from a horizontal to an upward and then to a downward direction to deliver it sealed. It will be understood that the open edges of the folded paper will be presented to the belts and that the distance between the belts transversely will be less than the width of the paper, so that its edges will be outside of the belts. In this disposition of the belts one edge of the latter will travel along near the wall of one of the side frames, preferably the left side, whereat the pasting and sealing devices are arranged.

In the rear side of the front belt-pulleys are mounted two shafts, one, 52, directly above the other, 53, the upper one, 52, between the oppositely-traveling sides of the upper belts and the lower one between the oppositely-traveling sides of the lower belts and both shafts equally distant from the path of the paper carried between the belts. (See Fig. 3.) Each shaft has an arm 54, provided with a paster 55, and the rotation of the shafts is so determined that both pasters are caused to rotate in the direction of the travel of the paper and to meet and deposit paste on the opposite sides thereof and to press upon it like the action of two hands brought together under pressure with the paper between them. These pasters are arranged to operate outside of the belts and in the path of the open edge of the paper to be sealed. Below the lower paster-shaft is a paste-containing receptacle 56, within which is mounted a roll 57, preferably of rubber, upon the circumference of which the lower paster will impinge in its rotation to take paste. A portion of the paste thus taken is transferred to the surface of the upper paster as they meet and impinge in their rotation. It will be understood that when this transfer of the paste from the surface of the take-up paster to the surface of the other paster is effected it will be between the papers, which are so timed in their feed to the belts as to have a space between them about equal to the length of the folded paper. For this purpose the feed of the papers is so timed that the pasters will make one revolution and meet and impinge under pressure between the papers, so that the next revolution of the paster will bring them upon the opposite sides of the paper. Therefore each paster will press upon the paper and leave paste at or near the edges thereof.

I prefer to channel or groove the surfaces of the pasters and to make such channels oblique to the path of the paper the better to retain and to transfer the paste to the opposite sides of the paper, as seen in Fig. 18. Preferably the pasters are fitted by stems within sockets in the arms, which contain springs 58, on which the pasters are cushioned, so that they will yield when they meet, and particularly with the paper between them. Stops retain the paster-stems in the sockets. The shafts of these pasters are geared together by equal gear 59, so that the faces of the pasters come together at every revolution.

A pinion 60, Fig. 1, engages the gear of the lower paster-shaft and the gear of the power-driven shaft for operating the pasters. This pinion is mounted on a short stud, so that the pinion will engage the large gear 49 on the power-driven shaft and the gear 59 on the shaft of the lower paster, and it is this engagement that rotates the pasters in the direction of and in unison with the travel of the belts.

A scraper in the paste-tank removes any surplus paste from the surface of the paster, and the latter in taking the paste from the roll thereby gives it an intermittent rotation in the paste, so that the paster is always sure to take paste in its contact with the roll, and for this purpose the paster impinges with pressure upon the roll. It will be understood that the paster-roll is only partially immersed in the paste and that the width of the roll is not greater and may be less than the width of the sealing-strip, while the width of the pasters may be greater than either; but I prefer to have the pasters, the ribbon, and the paste-roll the same width.

The ribbon feeding and sealing mechanisms are located at the rear of the pasting device. The ribbon web or strip 61 is preferably mounted by an arm 62, Figs. 2 and 6, hanging freely, and the web is freely held in a sort of yoke, so that the ribbon will be unrolled as required by the automatic feed of the sealing mechanism. For the proper feed of the ribbon I provide two positively-driven rolls, one, 63, of greater diameter, being fixed upon a horizontal shaft 65, suitably mounted on the frame, the other roll 64 being mounted upon a pivoted arm 66, preferably at the front side of the larger roll, Figs. 4 and 5, so that the ribbon passing over the latter will pass down between it and the smaller roll to give it a vertical direction. The larger of these rolls has an annular circumferential recess 67 of a depth about equal to the thickness of the ribbon and forms a guide therefor, while the smaller roll is adapted to fit within this recess against the ribbon, Figs. 3 and 14. These feed-rolls are preferably formed with circumferential gear 68, by which they are engaged and rotated, the smaller roll being maintained in such engagement and in contact with the ribbon. At the opposite side of the larger roll there is a guide-roll 69, mounted upon a pivoted arm 70 and adapted to fit and be held upon the ribbon within the surface recess of the larger roll, so that the ribbon passing beneath the guide-roll is maintained thereby in proper condition as it is fed over and upon the larger roll. For maintaining these small rolls in contact with the larger roll I prefer to connect the pivoted arms carrying the small rolls by a spring 71, the action of which is to draw the smaller rolls constantly toward each other against the larger rolls, whereby both said rolls have equal pressure upon the ribbon, Fig. 4. The feed of the ribbon is effected by being drawn by the geared rolls between them, and this feed is made intermittent, so that the ribbon will be fed at each movement a distance only sufficient to provide a strip 72, Figs. 3 and 15, long enough to be folded in two plies over the open edges of the folded paper and to be pasted thereto. This intermittent movement of the geared rolls is effected as follows: On the outer end of the shaft of the larger roll is fixed a small ratchet-wheel 73, which is engaged by a spring-held pawl 74, pivoted upon an arm 75, which is loosely mounted on said shaft at the outer side of the ratchet-wheel. This pawl-carrying arm is pivotally connected to an arm of the strap 76, Fig. 4, of an eccentric which is fixed upon the power-driven shaft 27, whereby the vibration of the arm 75 is made intermittent, and its pawl, acting upon the ratchet, intermittently rotates the ribbon-feeding rolls. As stated, this intermittent movement of the geared rolls draws the ribbon over the larger roll and feeds it down between them in a vertical position. In this drawing movement it will be understood that the stroke of the pawl 74 is such as to cause the roll 63 to feed the ribbon a length just sufficient to cause the end of the ribbon to rest upon the strip-supporting hook 90, and to prevent the possible turning of the feed-roll a greater extent than the stroke of the pawl I provide a disk $75^2$, Figs. 4 and 14, and a detent $75^4$, by means of a spring pressing or pulling upon said detent, is caused to engage; by means of a roll, the recesses $75^3$ of the disk, and thereby hold the disk from turning either back or forward, except as moved by the pawl. As shown, the ratchet-wheel 73 has six teeth, and the stroke of the pawl acting thereon rotates the ribbon-feeding roll 63, carrying with it the ribbon a distance which is the measure of the strip that is cut off, the forward and the return stroke of the pawl being for each revolution of the eccentric and for each strip fed and severed. Below the rolls, at their meeting feeding-point, is a vertical way or passage, within and through which the ribbon is fed and within which it is held for the action of a severing-knife. This way or passage is formed by and between two vertical plates 77, fixed so that their upper edges terminate in contact with the circumference of the rolls and form a slightly-flaring mouth to receive the ribbon therefrom, Fig. 15. Below this vertical way or passage and intersecting its rear wall, which joins the larger feed-roll, is a horizontal slot 78, and from the plates forming this opening extend back beneath the larger feed-roll two spring fingers or plates 79, Fig. 3, normally pressed by their spring grasping function in contact with each other at their free ends, between and through which the paper passes to be sealed. Within and horizontally across the vertical passage a knife-blade 80, Figs. 3 and 14, acts to sever the ribbon. For this purpose the knife-blade is mounted upon a bell-crank lever 81, pivoted on the frame and crossing inward at the front of said passage, and is actuated by a cam 82, carried on the outer vertical face of the feed-actuating eccentric $82'$. This cam has its acting face standing outwardly inclined, Fig. 6, and is placed so as to engage a stud 83, Fig. 4, on the outer end of the bell-crank lever, so that each revolution of the cam will engage this end of the lever and force it outward, and the knife-blade thereby will be forced inward across the vertical passage to sever the ribbon which hangs within said passage. A spring 84 places the lever 105 in its normal position after it has received the action of the cam, Fig. 14.

I provide for clamping the ribbon within the vertical passage by a horizontal arm 85 at the under side of the front passage-forming plate and having a horizontal slit 86, Fig. 16, which crosses the ribbon and through which the knife-blade works across the passage and into a corresponding slit 87 in the inner passage-forming plate. At its outer end this slitted arm 85 is pivoted to a fixed part, and a spring 88 connects said arm to hold it in its normal position out of the passage, as in Fig. 14. A spring 89, carried by the knife-actuating lever 81, is caused to engage the clamping-arm 85 and move it inward a little in advance of the severing action of the knife, whereby the ribbon is clamped within the vertical passage just before it is severed and released from said clamp after it is severed and just before the paper is advanced to receive it. To support the severed sealing-strip in position to receive the paper against it, a suitable rest 90, preferably of hook form, is provided below the horizontal opening 78, on which the lower end of the sealing-strip rests and is held, while its upper end is held free of the clamp and the knife within the vertical passage. In this free position the strip is supported at its lower end and stands mediately of its length across the path of the paper, which on coming in contact with the strip 72 causes its ends to be folded over the open edges and upon the opposite sides of the paper at the points whereon paste had been placed. In the passage of the paper between the spring sealing-plates 79 the ends of the folded strip will be pressed upon those portions of the paper which have received the paste.

While in Figs. 3, 5, and 15 the sealing-strip 72 is seen in hanging position, it is an important matter that it does not hang, but, having been severed by the knife from the web, its upper end is free and merely rests against the wall of the ribbon-guide below the knife, while the strip is supported at its lower end in position across the entrance 78 of the way by and within which the strip is folded into two plies over the edge of the paper, and it is this support which sustains the sealing-strip in its vertical position. Before it is severed, however, the sealing-strip hangs in its guideway and is clamped therein against the wall of the guideway by the clamp-arm 85 just before the strip is severed. Immediately upon being clamped the strip is severed, whereupon both the knife and the clamp are withdrawn and the strip stands free upon its rest just before it is struck by the edge of the paper to be folded in over it.

It is important to notice that the upper one 91 of the pulleys, which completes the sealing of the strip, is fixed upon the driven shaft, and therefore its function upon the paper is that of a pulley. It is of the same size and operates with the same speed as the driving-pulleys of the belts, so that the pressure upon the sealing-strip at the point where the paper passes between the two pulleys 91 and 92 is compensated for by the pulling action of the fixed pulley, and the paper is thereby kept in its proper position and course. In this support of the sealing-strip its upper end stands free just within the guideway; but one of the walls of the guideway stands down and has the horizontal opening 78 or slot across which the sealing-strip stands, and from this opening the spring-arms 79 extend, between which the sealed edge of the paper passes with the sealing-strip folded in two plies.

The clamp-arm is pivoted to the plate which forms the ribbon-guide and the knife works horizontally within the slit in the arm, while the spring 89, slitted to receive the knife, is secured to the knife-lever, but is only caused to act upon the clamp to force it against the ribbon when the knife is forced in to sever the ribbon. In this movement, however, the clamp-arm is forced against the ribbon by the pressure of the spring in advance of the severing action of the knife and the knife and the clamp are withdrawn simultaneously from the ribbon-guideway. At the rear of and in alinement longitudinally with the spring sealing-plates 79 and with the path of the sealed edges of the paper are two pulleys 91 and 92, between which the strip then pasted on the paper then passes and is pressed to complete the sealing thereof. The upper of these pulleys is fixed on the driven shaft, while the lower loose pulley of the upper belt, while the lower loose pulleys are fitted in a spring-pressed pivotally-hung arm 93, and yields by a spring 93', Fig. 2, for the passage of the paper. By these provisions the sealing-strip is first applied to the paper under pressure sufficient to lay it in two plies on each side of the paper at its open edges, and subsequently the pasted strip is subjected to greater pressure between pulleys 91 and 92 to reinforce the preliminary sealing.

Referring to Fig. 19, the paper as it leaves the sealing-pulleys is carried between the rear pairs of driven pulleys 36 37 and is deflected upward by the belts, which at this point above the pulleys part from each other, the upper belt passing upward and the lower belts passing over and downward from the rear pulleys 37 of the pairs, so that while the paper is carried upward from these pulleys by the travel of the belts above the rear pulleys of the pairs the paper as it emerges from the control of the belts at its lower part is carried over the rear pulleys. From these rear pulleys the belts pass downward in their return to the front pulleys.

The terminal loose spring-pressed pulleys 43 of the upper belts are in the rear of and contiguous to the terminal driving-pulleys 37 of the lower belts, and between these terminal pulleys 37 and 43 the belts again meet, both passing downward at their meeting-points, and seize the lower folded edge of the paper as it is carried over between them and force it down between the pulleys into the packing-box. To render certain and regular this transfer of the paper over the terminal pulleys 37 of the lower belts, I provide these pulleys with spring-sustained catches 94, Figs. 17 and 19, arranged, preferably, in a circumferential row on each pulley, so as to coöperate with the lower belts by seizing the edge of the paper as it emerges from the belts and carry it over and give it a diving direction and force, so that it will be seized with certainty by the meeting action of the belts between their terminal pulleys. These catches are preferably pivoted and are spring-sustained and free to be pressed inward; but their function is to engage the edge of the paper, and thereby assist the lower belts in carrying it over to be seized by the belts at the point where they meet, again moving downward. This reversal of the direction of the travel of the belts to deliver the paper forms, in connection with the function of the belts in carrying the paper to the pasting and sealing mechanism, features of my invention.

It is important in effecting the transfer of the paper over the pulleys as it emerges from the belts that the paper be held upon the belts, and thereby render certain the engagement of the edge of the paper with the spring-catches, and for this purpose I arrange one or more spring-sustained arms 95, hanging in position to receive the paper as it emerges and rises from the belts and insure its upward direction and hold its lower edge upon the transferring-belts. As shown, a pivoted arm 95 is for this purpose employed, hanging back of the shaft 35 of the lower belt-pulleys, and is maintained in proper position by a spring 96, which constantly tends to press its lower end against said shaft, as in Figs. 1 and 2. As the lower edge of the paper leaves the belts it is carried over the pulleys 37 against this convex fender-arm 95, which acts to hold the paper down upon the transferring-belts of the pulleys 37 and in engagement with the catches 94. To support the paper in position while it is being transferred at its lower edge to and between the terminal pulleys 37 and 43, I provide a receiving and holding way or cage, into which the sealed paper is directed by the belts above said pulleys and from which the paper is free to be drawn and delivered by the belts. This holding-way is formed of a backing of fingers fixed to and depending from one of the top pulley-shafts, and these fingers terminate in rearward curves over the terminal pulleys 43 of the upper belts, back of the delivery-passage for the papers. At their front side these fingers are supplemented by shorter fingers, which flare and curve toward the front, giving a wide entrance to the way. A spring 97, Figs. 1 and 19, preferably of leaf form, is centrally secured at the top of the way, with its ends standing at each side in position to arrest the ascent of the paper and prevent it from rising in transferring its lower end, which will be bent back under the pushing action of the pulley-catches, while the body of the paper is supported in the way. This arresting-spring is made adjustable vertically by a plug 98, clamped upon the central back-forming finger 48, so as to set the spring the proper height to cause the lower edge of the paper to ride upon and over the pulleys 37, by which it is shifted to reverse the direction of its movement for delivery into the packer. In this operation it is important that the upper sets of belts extend above and return over and in rear of the driving-pulleys of the lower belts, whereby the paper, having been forced from the belts to reverse the direction of its travel, is again seized by the same belts to deliver it, and in this delivery the belts, moving downward, seize the paper and the pulleys 43 yield to let it be drawn between them by the belts, as seen in Fig. 19.

From the belts the paper is delivered with its folded edge down into a packing-box 99 at the rear of the machine, the packer of which is operated as follows: The packer is a vertical push-frame 100, mounted to slide between the side frames upon horizontal ways 101, suitably fixed at the base of the machine, so that the paper passing from the belts at the delivery-pulleys 37 43 drops into the packing-box and is forced back with the pile out of the way for the reception of the next paper. The packer is operated by a rod 102, which pivotally connects the push-frame with the rock-arm 29, which reciprocates the slide 3, which transfers the paper from tilting ledge or shelf to the endless carrying-belts, whereby the packer and paper-transferring slide are actuated simultaneously, so that as a paper is advanced to the carrying-belts another paper is being pressed with the pile in the packing-box, and as the transferring-slide is moving to receive a paper from the tilting ledge or shelf the packer is moving back out of the way for the next paper falling into the box.

The arrangement of the front pairs of pulleys so that the upper ones 32 of each pair overhang at the front the lower ones of each pair permits the under sides of the upper pulley to hang slightly below the upper sides of the lower pulleys, as in Fig. 3, and thereby causes the upper belts to seize the paper, at which points the belts meet under sufficient tension to draw the paper evenly and regularly between the belts and free from pressure by the overhanging pulleys.

At the rear pairs of pulleys 36 37 the paper is only under the pressure of the belts as it passes upward between said pulleys, except where the edge of the paper passes between the sealing-pulleys 91 92, Fig. 1.

Both the transferring-slide 3 and the push-packer 100 are operated by the same crank connections with the power-driven shaft—that is, from the crank 26 on the power-driven shaft 27, Fig. 6, by the rod 25 connecting the arm 24 of the rock-rod 23, and from an arm 22, Fig. 3, on this rock-rod a rod 21 connects and operates the fly by its crank 20, which delivers the paper upon the transferring-slide. The connections for the packer, the transferring-slide, and the fly are so determined and disposed as to cause the transferring-slide 3 and the fly 9 to move toward each other, so that each will reach the limit of its movement at the same time.

The device which I have provided for feeding the papers to the sealing-machine is especially designed for feeding the papers in vertical position upon their folded edges and for coöperation with the action of the paper receiving and tilting ledge and the fly. The proper position of the papers for their feed is in a pile standing edgewise at the side of the sealing-machine, and the movement of the paper from the pile is at right angles to the movement of the fly, so that the advance paper of the pile is fed resting on its edge into a raceway, from which it is delivered upon the tilting ledge or shelf, from which it is pushed flatwise by the fly upon the transferring-slide and out of the path of the next succeeding paper.

There is a very important advantage gained in packing the papers to be fed on edge and feeding therefrom each paper on its edge, whereby there is comparatively little friction in sliding the paper, for it only has its own weight in such movement. Moreover, in feeding the paper from the pile the latter is maintained under pressure only sufficient to advance the standing pile against a fender, which supports the front sheet of the pile by its side, and on which the feed-catches are arranged to slide to engage the paper, so that each catch of the same slide will separately engage and feed a paper, so that two papers will be moved, one following the other, at the same time side by side into a raceway, where each paper is supported between vertical walls free from pressure in any direction and from which the papers are delivered singly, there being in motion from the pile three papers at the same time, and this, so far as I know and can find, is broadly new. This feed device in its application to my sealing-machine I will now describe.

The feed-box or holder 103 for the paper has a follower 104, standing vertically and sliding upon the bottom of the box. A hand-lever 105 passes vertically through a slot in the box and is pivotally connected to the follower and to a bracket below the box, and by this lever the follower is constantly pressed forward by a spring 106. At its front end the feed-box has a fence or fender of horizontal parallel slats or bars 107, between which and the follower the papers are supplied by hand, so that they rest upon their folded edges, stand vertical, and are maintained in a packed pile by the follower under the constant pressure of its connected spring. (See Figs. 6 and 8.)

The follower is connected to the hand-lever by a pivotally-connected link 108, by which the follower is made self-adjusting to the pile of papers. To ease the sliding of the follower it rests upon way-plates, Fig. 6, on which the papers also rest, and between the way-plates there are short inclines 110, on which the papers rest at the front end of the pile, to aid in keeping them in smooth condition to be taken out from the pile by the feed device. Each paper is seized from the pile at its outer vertical folded edge and moved or slid upon its lower folded edge from the box through a guide-passage or raceway extending sidewise from the inner side of the box in alinement with the fender-bars and delivered from said raceway to the fly of the sealing mechanism. This raceway is formed by an extension of the feed-box fender-bars and by corresponding bars 108, extending from the feed-box, and a trough 109 forms the bottom of the raceway, Fig. 3, which is open at its top and both ends. A feed device is arranged to be reciprocated vertically between the fender and the raceway-bars and is adapted to seize and to feed each paper from a pile into and through the raceway. This feed device consists of two parts, one of which is a slide 111, having a series of catches or ledges 112, standing within its inner side of and having a sufficient projection to engage the vertical edge of the front standing paper and slide it along on its edge. These catches are arranged to move two separate papers at a time and to engage them in succession, and each catch acts to move the paper a certain distance from the box into the raceway or guide-passage. The feed-slide of the box is fitted upon guide-rods 113, suitably mounted between the fence-bars, and it consists of a sort of cross-head carrying the catches, Fig. 13. The primary or initial catch is a vertical plate at the outer edge of the feed-slide and stands inward with only sufficient projection, Figs. 6, 10, and 12, to catch over the thickness of the folded paper at its edge and engages about two-thirds the height of the paper, Figs. 9 and 11, so as to take a proper hold upon the paper to move it regularly at the top and at the bottom. The extent of the stroke of the slide is such as to give to the paper an initial movement about or a little greater than half the length of the folded paper, as seen in Figs. 10 and 12. The next catches are formed by the ends of two horizontal plates, the edges of which stand vertical on the inner side of the feed-slide and distant from the initial catch a little less than the extent of the initial stroke of the slide and, like the initial catch, are adapted to engage the vertical edge of the paper at the point where it is left by the initial catch, as in Fig. 12. The two catches have a fixed relation to each other and to the slide and both move in the same vertical path and separately act upon separate papers at intervals, each moving it about the same distance, and the movements of both carrying the paper free of the pile and delivering it into the raceway outside of the box, as in Fig. 12, into which the raceway opens at the inner side of the box.

The raceway is open at the top and at each end and is wide enough to receive two papers as they are fed side by side into it one in advance of the other in lapping relation from the pile, and the papers are delivered from this raceway by means of an independently-traveling catch or ledge 114, fixed to a slide or carrier 115, which is fitted to reciprocate upon horizontal guide-rods 116, Fig. 13, which extend from that side of the feed-box which the raceway joins, and this slide or carrier is preferably mounted upon rolls, Fig. 9, fitted upon said guide-rods. This raceway catch or ledge 114 stands across the raceway and is preferably formed of a spring adapted to allow the paper to pass from the box between the wall of the raceway and said spring and to spring behind the vertical edge of the paper to engage it and push it out of the raceway, as in Figs. 6 and 10. The guide-rods for these slides are suitably fixed in standards at each side of the feed-box and by a suitable support at the delivery end of the raceway, as in Figs. 9 and 11.

The extent of the stroke of the raceway-catch is from near the entrance of the raceway to a little outside of its delivery end, so as to allow it to engage the paper at the point where it was pushed by the initial slide and to clear it of the raceway, as seen in Figs. 10 and 12. The two slides have movements independent of each other and are preferably operated by the same driven part.

The separate feed-slides are operated as follows: From a suitable bracket 117, firmly supported above the raceway, is pivotally connected a hanging bar 118, which pivotally connects with the carrier 115 of the raceway-catch. Since this carrier reciprocates horizontally, the said hanging bar has a slot 119 at its carrier connection to permit the bar to move in the arc of a circle in operating the carrier. The initial slide 111 is connected to the raceway-catch carrier by a bar 120, which pivotally connects the initial slide with the hanging bar at a point between its point of suspension and its connection with the raceway-catch carrier, as in Figs. 9 and 11, whereby both catch-carriers are caused to move together, but independently of each other. The feed device is operated from the initial catch-carrier by a rod 121, pivotally connecting said carrier with a crank 122, fixed on a rock-shaft 123, the rod connections with the catch-carriers and with the crank being preferably at the outer or front side of the feed-box fender and raceway.

The pile of papers is supported under pressure against the inner side of the box-fender, so that the front paper of the pile will always be in alinement with the entrance of the raceway, the side of which opening into the box being rounded or formed to give free entrance of the paper into the raceway from the box, as in Figs. 10 and 12. As the catches or ledges operate in vertical planes at the inner side of and against the box-fender, their plane of movement is also in alinement with the raceway, and the front paper of the pile is in contact with the intermediate feed-catch while the latter is delivering paper from the pile into the raceway, which had previously been moved by the initial catch, as in Fig. 10. For this purpose the intermediate catch is formed of plates 112, which slide against the inner sides of the fender-bars, so that the vertical edges stand toward the raceway and form the catches or ledges that engage the vertical edge of the paper and carry it into the raceway, as in Fig. 12.

While the two slides are moved back and forth together, the extent of the movement of the terminal carrier is about twice that of the initial carrier; and the connections of these catch-carriers with their operating-crank 122 are determined and arranged to cause the terminal catch-carrier 115 to move with considerably greater speed than the initial catch-carrier 111 in order to effect the feed of the papers from the box into and out of the raceway, so that two papers will be moved by the action of the feed-catches in succession from the pile and by the same movement of the catch-carrier, and one paper will be moved out of the raceway at the same time the intermediate catch engages a paper of the pile. In this operation it is important to notice that the crank 122 has a vibrating movement with a throw equal to the extent of the movement of the initial catch-carrier and will give the feed of the papers as follows: The initial catch, being at the limit of its outward movement, as seen in Figs. 9 and 10, will stand across and engage the vertical edge of the front paper of the pile and move it to a point, say, a little greater than half the width of the box, as seen in Figs. 11 and 12. The return movement of the initial catch 112 causes it to engage and again move the next paper from the pile to the same point, while at the same time the intermediate catch is moved over and against the face of the paper first fed and engages its edge, and both catches moving together cause the first-fed paper to be delivered entirely into the raceway and the second-fed paper to be delivered partly into the raceway back of and in lapping relation to the first-fed paper, as seen in Fig. 12. In this position of the two fed papers the terminal catch will be at the delivery end of the raceway, as in Fig. 12, so that while the initial catch is returning to engage and feed a third paper the terminal catch will move to engage the inner vertical edge of the paper standing in the raceway, as in Fig. 10. In this movement of the terminal catch it slides over the paper with a slight pressure thereon and springs over the edge of the paper to engage it, as in Fig. 10. Therefore in the operation of the feed device while two papers are being fed at the same time from the feed-box into the raceway one of the two papers only is being fed entirely into the raceway, and while this paper is being delivered from the raceway by the terminal catch another paper is being partly fed from the pile into the raceway by the initial catch, the three papers moving side by side, one in advance of the other, as in Fig. 6. The raceway has a width sufficient to receive only papers in close contact, so that they will act to hold each other between the walls of the raceway under sufficient compression and friction to prevent them from being moved back into the box by the terminal catch moving back in contact with one and the intermediate catch moving back in contact with the other. The swing of the hanging rod 118 is such as to move the terminal catch about twice the distance of that of the initial catch and much faster, so that a paper is moved out faster than the two which are fed into the raceway. This while giving an effective feed of three papers at the same time, each in advance of the other, maintains the proper relation of the papers to each other in effecting their movement from the pile and from the raceway and renders their delivery from the raceway with certainty at intervals to suit the further movement and treatment of the paper to carry it out of the way before the next paper is started upon its delivery movement. From the raceway the paper is delivered upon the tilting ledge or shelf 5, which is in alinement with the raceway and slightly below the level of the trough 109 thereof, and the paper is supported when so delivered in a vertical position by the guard-rail 17 above and coacting with the tilting shelf, as seen in Fig. 3. In the organization of the machine wherein the papers are fed edgewise from a pile, as I have described, the operation of such feed devices is effected in unison with the operation of the sealing and delivering mechanism by connecting the crank-actuating shaft 123 of the feed-device with the power-driven shaft 27 of the machine by means of a crank 124 on the shaft 123, Fig. 6, connecting by a vertical rod 125, Fig. 3, with the crank 26 of the power-driven shaft. By these connections the crank 26 actuates in their proper time the cranks 24 and 29, Fig. 3, by which the slide 3 and the packer 100 are simultaneously operated and the crank 22, by which the fly and this shelf are operated. The timing of these operations is in unison with the speed of the system of belts, with the pasting devices, with the ribbon-feeding device, and with the device for severing the sealing-strip from the ribbon. The functions and the operation of the several devices specifically and as to their coöperation having been stated, it is deemed only necessary to further state that the papers as they are delivered upon the shelf are dropped flatwise upon the slide between the vertical cheek-plates 126, so that the paper will be advanced by the slide 3 to the belts with its free folded edges in longitudinal alinement with the feed of the ribbon. In its advance the forward edge of the paper arrives at the pasters just as in their revolution they meet on the opposite sides of the paper and impress paste thereon under pressure, the rotation of the pasters being in the same direction as the travel of the paper, as in Fig. 3. Following this deposit of paste on the paper the ribbon is fed by the geared rolls a length to form the sealing-strip, the strip severed by the knife and freely supported at its lower end upon the rest 90, so that the strip in the middle of its length will stand in the path of the paper, which at once striking the strip folds it into two-ply and carries it between the spring-fingers 79, which apply the unpasted strip to the paper. Emerging from these spring-fingers, the sealing-strip 72 is passed between the pulleys 91 and 92 under a yielding pressure from the lower pulley to complete the sealing, and the paper is immediately diverted upward between the pulleys 36 and 37 to reverse its direction and deliver it from the belts. In this operation the belts are the means for propelling, supporting, and carrying the paper from the initial pulleys 32 and 33 to the terminal pulleys 37 and 43 and of holding the paper so that its edge will preferably travel along a wall-groove 127, formed in a bracket 128, Figs. 14, 15, and 16, as the paper passes to receive the strip and through the sealing spring-fingers 79.

The paper in dropping into the box slides down upon ways or plates 129, extending from the fender 130 at each side of the box, and to prevent the dropped paper from constantly falling back in the way of the succeeding dropping paper as the paper moves away from it a spring 131 and a spring-catch 132 may be provided at the box side back of the fender-plates. The packer strikes the paper on the ways 129 and pushes it over the spring and the catch, so that it cannot fall back in the way of the next dropping paper.

It will be understood that the tilting shelf, which I have shown and described, forms a coacting element with the devices, whereby the papers are fed vertically edgewise from a pile and that the said shelf may be dispensed with when other means or ways are provided for delivering the papers to the sealing mechanism, that the shelf may be used with means equivalent to those described, and that as a receiver and holder for the paper timed to deliver it to a device which advances it to the sealing mechanism constitutes itself a part of the invention, as well as a coacting element with feed devices and with the paper-transferring slide. It will also be understood that immaterial changes may be permitted from the general construction and arrangement of parts contributing toward my invention, and that many of the devices above described are not essential to the several features of my invention separately considered. This will be indicated in the concluding claims, as in any given claim the omission of an element or the omission of reference to the particular features of the elements mentioned is intended to be a formal declaration of the fact that the omitted elements are not essential to the invention therein covered.

It is important to note that the object of feeding the papers by separate and distinct movements is a precaution against the delivery of more than one paper at a time. Coöperating with the intermittent action of the paper-feeding device the inclines at the feed end of the paper-holder over which the papers ride are for the purpose of holding the paper next to the one being pulled out of the pile by the feed device, for it will be noticed that the paper being fed slides upon the bottom of the holder between the feed device and the highest or butt ends of the inclines, while the paper next to the one being fed from the pile rests upon and across the inclines, which, being thin plates, serve as detents to hold the paper and prevent it from being carried by the friction of the outgoing paper. As each paper is fed out from the pile the next paper is pressed off the inclines and drops in front of them upon the bottom of the holder.

I claim—

1. For sealing the free edges of folded newspapers the combination, of mechanism for pasting, sealing and delivering the sealed paper, with a system of endless traveling belts arranged in upper and lower sets whereby the paper is seized and between which it is supported and carried in the operation of pasting, sealing and delivering it, an advancing device for receiving the papers, means for operating said device for delivering the papers to the belts, and a fly and means for operating it to deliver the papers to the advancing device.

2. For sealing the free edges of folded newspapers, the combination, of mechanism for pasting, sealing and delivering the sealed paper, with a system of endless traveling belts arranged in upper and lower sets, by which the paper is seized and between which it is supported and carried in the operation of pasting, sealing and delivering it, an advancing device for receiving the papers, and means for operating the device for delivering the papers to the belts.

3. In a machine for sealing the free edges of folded newspapers, the combination, of mechanism for pasting, sealing and delivering the sealed paper, with a system of endless traveling belts arranged in upper and lower sets, by which the paper is seized and between which it is supported and carried in the operation of pasting, sealing and delivering it, a slide device for advancing the paper to the belts, means for operating said device, and a shelf or ledge for receiving the paper, and means for operating the shelf for transferring the paper therefrom to the said slide.

4. In a machine for sealing the free edges of folded newspapers, the combination of mechanism for pasting, sealing and delivering sealed paper, with a system of endless traveling belts arranged in upper and lower sets, by which the paper is seized and between which it is supported and carried in the operation of pasting, sealing and delivering it, a slide device for advancing the paper to the belts, a shelf or ledge pivotally mounted for receiving the paper and transferring it to said slide, a fly arranged to push the paper from said shelf, means for operating the shelf by connections with the fly, and means for operating the fly.

5. In a machine for sealing the free edges of folded newspapers, the combination of mechanism for pasting, sealing and delivering the sealed paper, with a system of endless traveling belts arranged in upper and lower sets, whereby the paper is seized and between which it is supported and carried in the operation of pasting, sealing and delivering it, a slide device for advancing the paper to the belts, a shelf or ledge for receiving the paper and transferring it to said slide, a fly arranged to push the paper from said shelf, means for operating the shelf by connections with the fly, a packer for the sealed papers at the rear of the belts and means connecting the slide, the fly, the packer and the power-driven shaft for simultaneous operation in the way described.

6. In a machine for sealing the free edges of folded newspapers, the combination, of mechanism for pasting, sealing and delivering the sealed paper, with a system of endless traveling belts arranged in upper and lower sets, whereby the paper is seized and between which it is supported and carried in the operation of pasting, sealing and delivering it, a device having detents for advancing the paper to the belts, a packer for the sealed papers at the rear of the belts and means for connecting the slide, the packer, the driven belt-pulley shafts and the driven power-shaft, whereby the several devices are actuated in unison in carrying the papers through the machine.

7. In a machine for sealing the free edges of folded newspapers, the combination of mechanism for pasting, sealing and delivering the sealed papers, with a system of endless traveling belts arranged in upper and lower sets, by which the paper is seized and between which it is supported and carried in the operation of pasting, sealing and delivering it, a device having detents for advancing the paper to the belts, a pivotally-mounted shelf or ledge for receiving the paper and transferring it to said slide, a fly arranged to push the paper from said shelf, the said shelf having an arm, and the said fly having a stud for engaging said arm, a spring connecting said shelf and a stop for controlling the normal position of said shelf, whereby the movement of the fly automatically operates the shelf.

8. In a machine for sealing the free edges of folded newspapers the combination of mechanism for pasting, sealing and delivering the sealed paper, with a system of endless traveling belts, arranged in upper and lower sets, whereby the paper is seized and between which it is carried and supported in the operation of pasting, sealing and delivering it, a slide for advancing the paper to the belts, a device for depositing paste upon the paper, consisting of a pair of spring-sustained pasters adapted to rotate in the direction of the travel of the paper and to seize and impress paste upon its opposite sides, means for supplying paste to the pasters and means for effecting the movements of the slide and the pasters whereby the paper will be advanced so that its free edges will arrive at the point where they will be embraced and compressed between the surfaces of the pasters.

9. In a machine for sealing the free edges of folded newspapers, the combination of mechanism for pasting, sealing and delivering the sealed paper, with a system of endless traveling belts arranged in upper and lower sets, whereby the paper is seized and between which it is supported and carried in the operation of pasting, sealing and delivering it, a device having detents for advancing the paper to the belts, a pivotally-mounted shelf having the arms 11 and 16, a guard-rail 17, a stop-arm 14, and a spring 8, whereby the shelf is caused to be tilted forward with the laying movement of the fly and returned to its normal position to receive and support a paper, and means connecting the power-driven shaft for actuating said fly.

10. In a machine for sealing the free edges of folded newspapers, the combination of mechanism for pasting, sealing and delivering the sealed paper, with a system of endless traveling belts arranged in upper and lower sets, whereby the paper is seized and between which it is supported and carried in the operation of pasting, sealing and delivering it, a slide device for advancing the paper to the belts, a pivotally-mounted shelf, and a fly connecting and operating said shelf, a packer at the rear of the machine, and connections for conjointly operating the slide, the shelf, the fly and the packer, consisting of the cranks 29 and 22 and the rods 28, 21 and 102, and the crank 26, on the power-driven shaft, the rod 25 and the crank 24 on the rock-rod 23, the said cranks being arranged to operate the said devices in the order and relation stated.

11. For sealing the free edges of folded newspapers, the combination of mechanism for pasting, sealing and delivering the sealed paper, with devices for advancing the papers, of a system of endless traveling belts arranged in upper and lower sets upon driving and loose pulleys whereby the paper is seized and between which it is supported and carried in the operation of pasting, sealing and delivering it, the receiving ends of the upper belts extending in front of and overhanging the lower belts, whereby the paper is caused to enter the belts free from pressure by the overhanging pulleys, and devices for pasting and sealing the papers as they are carried by and between said belts.

12. In a machine for sealing the free edges of folded newspapers, the combination of mechanism for pasting, sealing and delivering the sealed paper, with devices for advancing the papers, a system of endless traveling belts arranged in upper and lower sets whereby the paper is seized and between which it is supported and carried in the operation of pasting, sealing and delivering it, the receiving and the terminal ends of the upper belts being mounted upon loose pulleys and driven by an intermediate pulley, and the receiving ends of the lower belts mounted upon loose pulleys and the terminal ends of said belts mounted upon driven pulleys arranged between the driving and the loose pulleys of the upper belts for operation in the way described.

13. For sealing the free edges of folded newspapers, the combination, with devices for advancing a folded newspaper, devices for pasting its free edges, devices for feeding a sealing-ribbon, devices for severing a sealing-strip from the ribbon, of a system of endless traveling belts whereby the paper is seized from the advancing devices, supported and carried between the belts to and between a pair of pasters, to devices which present to the paper a severed ribbon strip, and is reversed in the direction of its travel and delivered from between the belts.

14. For sealing the free edges of folded newspapers a carrying device for the papers consisting of a system of endless belts arranged in upper and lower sets, by which the paper is seized and between which it is supported and carried in the operation of pasting, sealing and delivering it, the combination therewith of a device for reversing the direction of the travel of the paper located and arranged above the driving-pulleys of the lower sets of belts and between the oppositely-moving sides of the upper sets of belts and mechanism for pasting, sealing and delivering the sealed paper.

15. For sealing the free edges of folded newspapers an advancing and carrying device for the paper consisting of two or more sets of endless belts arranged as an upper set and a lower set, the upper belts mounted upon loose initial and terminal pulleys and intermediate driving-pulleys, the lower belts mounted upon initial loose and fixed driving terminal pulleys, the upper and the lower belts moving in contact from the loose initial pulleys to and up between the driving-pulleys, the upper belts extended upward over the fixed terminal driving-pulleys of the lower belts terminating upon the loose pulleys in combination with mechanism for pasting, sealing and delivering the sealed paper, at the rear of the terminal driving-pulleys, whereby without leaving the belts, the paper is seized, and in its travel is supported and has its free edges pasted and sealed in that part of its travel between the initial and the driving pulleys and is delivered from the machine.

16. An advancing, carrying and controlling device in a machine for sealing the free edges of folded newspapers, consisting of a system of endless traveling belts arranged in an upper and lower set by which the paper is sealed, and between which it is supported and carried in the operation of pasting, sealing and delivering it, the combination therewith of mechanism for pasting, sealing and delivering the sealed paper, a device for reversing the direction of the travel of the paper, located and arranged, above the driving-pulleys of the lower belts, and between the oppositely-moving sides of the upper belts, the said reversing device consisting of fixed fingers standing back of the delivering-passage of the terminal pulleys of the belts, and a pivoted spring-controlled arm normally standing in front of the said delivering-passage for cooperating with the belts in the way described.

17. For sealing the free edges of folded newspapers an advancing and carrying device for the papers consisting of a system of endless belts arranged in upper and lower sets, by which the paper is seized and between which it is supported and carried in the operation of pasting, sealing and delivering it, the combination therewith, of mechanism for pasting, sealing and delivering the sealed paper, a device for reversing the direction of the travel of the paper located and arranged above the driving-pulleys of the lower belts and between the oppositely-moving sides of the upper sets of belts, and weights for the upper and lower sets of belts, whereby the system of belts is maintained under proper tension for operation in the way described.

18. The combination, with devices for advancing a folded paper, devices for pasting its free edges, devices for feeding a sealing-ribbon, devices for severing a sealing-strip from the ribbon, of a system of endless traveling belts arranged upon loose and driving pulleys in upper and lower sets, the upper sets extending above and returning downward over and in rear of the terminal driving-pulleys of the lower sets, and means located and arranged between the oppositely-moving sides of the upper belts, whereby the paper having emerged from between the belts is caused to be again seized by them for delivery.

19. An advancing, carrying and controlling device, in a machine for sealing newspapers, consisting of upper and lower sets of endless traveling belts, the upper sets of belts mounted upon the loose pulleys 32, 40, 41 and 43, and the driving-pulleys 36, the lower sets of belts mounted upon the loose pulleys 33, and the fixed pulleys 37, the weighted roll 46 for each belt, the driving-pulleys of the lower belts being between the driving and loose pulleys 36 and 43 of the upper belts, in combination with the fixed and spring-controlled fingers 48 and 95 arranged between the oppositely-moving sides of the upper belts and coöperating with the upper and the lower belts for operation in the way described.

20. For sealing the free edges of folded newspapers the combination with devices for advancing the papers, of a system of endless traveling belts arranged in upper and lower sets whereby the paper is seized and between which it is supported and carried in the operation of pasting, sealing and delivering it, means whereby the belts are maintained under yielding tension in advancing the paper between them, and devices for pasting and sealing the papers as they are carried by and between said belts.

21. For sealing the free edges of folded newspapers, the combination with devices for advancing the papers, of a system of endless traveling belts arranged in upper and lower sets whereby the paper is seized and between which it is supported and carried in the operation of pasting, sealing and delivering it, means whereby the belts are maintained under yielding tension in advancing the paper between them and a pair of pasters adapted to meet in their rotation and transfer under pressure paste on both sides of the paper as it is carried between and with the rotation of the pasters, and mechanism for sealing and delivering the sealed paper.

22. For sealing the free edges of folded newspapers, the combination with devices for advancing the papers, of a system of endless traveling belts arranged in upper and lower sets whereby the paper is seized and between which it is supported, and carried in the operation of pasting sealing and delivering it, devices for pasting and for sealing the papers as they are carried by and between said belts, means for rendering certain the transfer of the paper over the driven pulleys 37 and between the belts at their terminal meeting between the pulleys 37 43, consisting of the fixed fingers 48 and the pivoted spring-sustained finger 45 and the spring-sustained catches of the said driven pulleys, arranged for coöperation with the upper and the lower sets of belts as set forth.

23. In a machine for sealing the free edges of folded newspapers, the combination with endless traveling belts arranged in upper and lower sets, of means for advancing the paper to and between the belts, pasters arranged to rotate whereby one receives paste and transfers it to the other and both to the opposite sides of the paper, means for applying an unpasted sealing-strip to the pasted sides of the paper, means for applying pressure to the sealing-strip and means whereby the belts are extended upward and returned downward whereby to reverse the direction of the travel of the paper in the way and for the purpose stated.

24. In a machine for pasting folded newspapers and applying thereto a sealing-strip, the combination, with a system of endless traveling belts, arranged in upper and lower sets whereby the paper is seized and between which it is supported and carried in the operation of pasting, sealing and delivering it, of a pair of pasters rotating in the direction of the travel of the paper in the path of the free edges to be sealed and timed to meet under pressure on the opposite sides of and at the free edges of the advancing paper, to impress paste thereon, means for supplying paste to the under paster, and means for applying the sealing-strip to the paper in the way described.

25. In a machine for sealing the free edges of folded newspapers, a pair of spring-sustained pasters, mounted upon shafts arranged one above the other, whereby the pasters will in their rotation, meet under pressure, means for causing the lower paster to take paste in its revolution, and transfer therefrom, paste to the upper paster as they meet in contact with each other, means for causing the paper to be sealed to be carried between the meeting faces of the pasters to receive paste therefrom on its opposite sides, the movement of the paper and the rotation of the pasters being so timed that the pasters will meet in contact with each other whereby one will transfer paste to the other and make a second revolution to cause them to meet on the opposite sides of the advancing paper to deposit the paste at the open edges to be sealed, and means for applying a sealing-strip to the pasted sides of the paper.

26. In a machine for pasting newspapers and applying a sealing-strip thereto, the combination, with a system of endless traveling belts arranged in upper and lower sets whereby the paper is seized and carried in the operation of pasting, sealing, and delivering it, of a pair of spring-sustained pasters rotating in the direction of the travel of the paper, in the path of the free edges to be sealed and meeting under pressure on the opposite sides of the paper at the point to be sealed, shafts for carrying said pasters arranged one above and the other below the path of the paper and gearing for rotating the pasters consisting of the equal gear 59, a gear 49 on the power-driven shaft and a pinion 60 engaging the equal gear with the driving-gear, means for supplying paste to the under paster and means for applying the sealing-strip to the paper.

27. In combination in a machine for pasting folded newspapers and applying thereto a sealing-strip, a system of endless traveling belts arranged in upper and lower sets whereby the paper is seized and between which it is supported and carried in the operation of pasting, sealing and delivering it, the pasters 55 rotating in the direction of the travel of the paper and adapted to meet and deposit paste on the opposite sides thereof under pressure, a sealing device consisting of plates 77 forming a passage between them, means for feeding a ribbon through said passage, a transverse slot 78 in one of said plates, a rest 90 below said slot for supporting a sealing-strip freely in the path of the paper, a clamp and a knife above said slot and a pair of spring-fingers extending back from the edges of said slot, for operation in the way described.

28. In a machine for sealing the free edges of folded newspapers, a pair of rotating arms, each having socketed or connected therewith a spring-sustained grooved or channeled surface, adjusted so that in rotating the said channeled surfaces will meet under pressure, in combination with means for advancing a newspaper between said pasters, means for supplying one or both of said pasters with paste, and means whereby the paper and the pasters are caused to meet to transfer paste from the pasters to the opposite sides of the paper, and means for applying to the latter a sealing-strip.

29. In a machine for sealing the free edges of newspapers, the combination, with mechanism for carrying a newspaper through the machine, of a pair of rotating pasters adapted to meet under pressure in their rotation in the path of the paper, a pasting device whereby paste is transferred to one of the pasters, which transfers paste to the other when meeting, the movement of the carrying mechanism being timed to cause the pasters to meet under pressure with each other whereby paste is transferred from one to the other in advance of the paper and to meet in their succeeding revolution on the opposite sides of the advancing paper to transfer the paste thereto at the edges to be sealed, mechanism for presenting a sealing-strip across the path of the pasted paper, and mechanism for applying said sealing-strip to the free edges of the paper to be sealed.

30. For sealing the free edges of folded newspapers, the combination with a suitable device for feeding a sealing-ribbon, a clamp and a knife operating to hold the ribbon and to sever a strip therefrom, and a rest on which the strip is freely supported at its lower end, means for feeding a newspaper to receive said strip, means for applying paste to the opposite sides of the paper, and means for applying and sealing the strip to the pasted paper.

31. For sealing the free edges of folded newspapers, the combination with a suitable device for feeding a sealing-ribbon, a clamp and a knife operating to hold the ribbon and sever a strip therefrom, a rest on which the strip is freely supported at its lower end, means for feeding a newspaper to receive said strip, means for applying paste to the opposite sides of the paper and means for applying and sealing the strip to the pasted paper consisting of the spring-fingers 79 79 and the pulleys 91, 92, between which the paper with the adhering strip passes, whereby the strip is folded and laid and then subjected to pressure between rolling surfaces.

32. For sealing the free edges of folded newspapers, the combination with suitable means for feeding a sealing-ribbon, means for severing a strip therefrom, means for feeding a newspaper to receive said strip, and means for applying paste to the opposite sides of the paper, of means for applying and sealing the strip, consisting of spring-fingers, and a pair of pulleys one of which is driven and the other is loose and sustained under pressure upon the sealing-strip.

33. For sealing the free edges of a folded newspaper, having its opposite sides provided with paste, a feed device for the ribbon consisting of the positively-geared rolls 63 64, a passage vertically in alinement with the meeting surfaces of said rolls, formed by plates 77, one of which has a slot 78 and below it a hook or rest 90 crossing the line of the passage and freely supporting the strip at its lower end, a clamp for holding the ribbon while being severed, a knife for severing the ribbon at the clamp, and means for intermittently actuating the geared feed-rolls, and for pasting the opposite sides of the paper.

34. For sealing the free edges of a folded newspaper having its opposite sides provided with paste, a feed device for the ribbon consisting of the roll 63 having the circumferential groove 67, the roll 64 engaging said groove, said rolls having engaging gear whereby they are positively rotated, and the roll 69, the said rolls 64 and 69 being on opposite sides of the roll 63 and maintained in contact therewith under a yielding pressure, a way or passage for the ribbon descending in alinement with the meeting surfaces of said geared rolls, a clamp and a knife for holding and severing a strip from the ribbon, a hook or rest for supporting the severed strip, the spring-fingers 79 79 for folding and applying the sealing-strip, and means for intermittently rotating said geared rolls.

35. For sealing the free edges of a folded newspaper, the combination, with the geared rolls 63 and 64 for feeding a sealing-ribbon, a severing, holding and folding device for a sealing-strip, consisting of a bracket or plate having a slot 78 transverse to the feed of the ribbon, spring-fingers extending horizontally back from the edges of said slot, a passage or way in alinement with the meeting surfaces of said rolls, a clamp and a knife crossing said passage between the rolls and the said slot, and a rest for the severed sealing-strip below said slot and means for pasting the free edges of the paper as it is advanced against the sealing-strip.

36. In a machine for sealing the free edges of folded newspapers, a feeding device for a sealing ribbon or strip, consisting of a roll having a circumferential guide groove or recess 67 for the ribbon, a roll 64 engaging the ribbon in said recess, both said rolls being geared together, and a roll 69, the pivoted spring-connected arms carrying said rolls and means for intermittently rotating said geared rolls.

37. In a machine for sealing the free edges of folded newspapers, the combination, of the geared rolls one driving the other for feeding a sealing-ribbon, means for intermittently actuating said rolls consisting of a ratchet-wheel 73 on the driving-roll shaft, a knife for severing a strip from the ribbon, and a clamp for said ribbon, with means for actuating these parts, consisting of an eccentric 82' on the power-driven shaft, an arm and a pawl 74 connecting the strap and the ratchet-wheel, a spring 84 for withdrawing the knife, a spring 89 for forcing the clamp upon the ribbon and a spring 88 for releasing said clamp.

38. In a machine for sealing the free edges of folded newspapers and in combination with endless traveling belts arranged in upper and lower sets, whereby the paper is seized and between which it is supported and carried in the operation of pasting, sealing and delivering it, a device for advancing the paper to the belts, a fly device for laying the paper upon the slide, a pair of rotating pasters between the meeting surfaces of which the paper is caused to travel and is pasted, mechanism for feeding and severing a strip from a ribbon, and a device for freely supporting the severed strip across the path of the paper, and having spring-fingers through which the paper and the strip are carried for folding the strip upon the pasted paper, pressure-pulleys between which the sealing-strip is carried to reinforce the sealing, and mechanism whereby the operation of these several devices is conjointly effected.

39. The combination with a holder and feeding mechanism for advancing on edge the front paper from a standing pile, and means for supporting the paper singly while being fed, of a shelf or ledge for receiving and holding the paper on its edge, means for tilting the shelf to deliver the paper, and means for carrying, pasting and sealing the edges of the papers.

40. The combination with a holder and feeding mechanism for advancing on its edge the front paper from a pile standing on edge, of a raceway formed by vertical walls between and by which the paper is supported on edge, and a shelf or ledge at the end of and in alinement with said raceway for receiving and holding the paper, means for tilting said shelf to deliver the paper, and means for carrying, pasting and sealing the edges of the papers.

41. In a machine for sealing the free edges of folded newspapers, the combination with mechanism for carrying the paper, means for feeding a sealing-strip, and applying the same, a device for advancing the paper to the carrying mechanism, and a device for receiving the paper, edgewise in vertical position, and delivering it upon said advancing device, of mechanism for feeding the papers vertically on their folded edges from a pile and transferring them in succession upon said receiving device in standing position, and means for conjointly connecting the several parts to effect the operations described.

42. The combination in a machine for sealing the free edges of paper, of mechanism for carrying, pasting, sealing and delivering the sealed paper, with a holder adapted to receive a pile of papers standing on edge, devices for feeding a sealing-strip, devices for feeding the papers vertically edgewise and at right angles to the line of travel of the carrying mechanism, and means for connecting the said feeding devices with the said carrying and strip-feeding mechanism, timed to feed the papers in unison with the travel of the carrying mechanism, and mechanism for applying the sealing-strip.

43. In a machine for sealing the free edges of folded newspapers, the combination with mechanism for carrying the paper, means for feeding, and for applying the sealing-strip, a slide for advancing the paper to the carrying mechanism, a pivotally-mounted shelf for receiving the paper edgewise in vertical position, and means for tilting said shelf to transfer said paper to the advancing slide, of a holder for holding the papers in pile standing edgewise, mechanism for feeding the papers vertically on their folded edges from the pile and transferring them in succession upon said receiving-shelf, and means for actuating said feeding mechanism in unison with the movements of the shelf, and with the carrying, pasting and sealing mechanism.

44. The combination with a holder adapted to receive a pile of papers standing on their edges, and a fender or guard at the feed end of said pile whereby the papers are supported in vertical position, of a slide having catches 112 movable in the same plane and arranged to engage and move the paper by successive steps from and free of the pile, a raceway formed by parallel inclosing walls adapted to receive and support the paper as it is moved by the said catches, a separate and independent movable catch adapted to engage the paper at the point where it was left by the intermediate catch, a shelf device arranged to receive the paper from the last catch in position for delivery, the pivoted connections 118, 120 whereby the said several catches are connected and means for operating said catches independently of each other.

45. In a device for feeding papers from a pile, a vertical raceway having walls adapted to hold two papers on edge side by side, the combination with said raceway, of three catches two of which are adapted to engage each a separate paper and simultaneously move them from the pile, a third catch movable independently of the others and having a greater stroke, and adapted to engage and move the paper left by the intermediate catch, whereby three papers are in movement simultaneously in the operation of delivering them, the travel of each paper being so timed as to cause the independent catch to move a paper from the raceway while two other papers are being moved simultaneously into the raceway.

46. In a machine for sealing the edges of papers, the combination with means for carrying, pasting and sealing the papers, and a shelf or ledge and means for tilting it, of devices for feeding and delivering the papers to said shelf, consisting of a holder for a pile of papers, means for maintaining the pile under pressure, the catches 112 arranged to act in succession horizontally across the holder to engage and move the papers edgewise from the box, one in advance of the other intermittently, a raceway arranged in alinement with said catches, having a bottom and adapted to receive and support two of the papers side by side, one in advance of the other as they are fed from the holder, an independently-acting catch 115 arranged to act horizontally within said raceway and engage and deliver the papers therefrom in succession and means for operating said catches simultaneously and in succession.

47. In a device for feeding papers from a pile, a vertical raceway having walls adapted to hold two papers on edge side by side, the combination with said raceway, of a catch 114 adapted to engage and deliver a paper, and catches 112 112 movable together independent of the raceway-catch, for engaging each a paper and delivering it into said raceway whereby three papers are in movement at the same time, the said raceway-catch having a greater stroke than the catches for moving the papers from the pile.

48. The combination with a holder adapted to maintain a pile of papers under pressure standing on edge, a fender closing the feed end of said holder, and a laterally-extending raceway in alinement with the inner wall of said fender and having a bottom trough 109, of catches 112 arranged to slide horizontally along the inner walls of said fender and adapted to engage the same paper by successive steps to carry it from said box into the raceway, a terminal catch 114, arranged to slide horizontally within the raceway and means for separately operating the said catches consisting of the pivotally-connected arms 118, 120, 121 and the crank 122, whereby three papers will be separately moved by successive steps from the pile to deliver each in succession from the raceway, and means for actuating the said crank.

49. The combination with a holder adapted to receive a pile of papers standing on edge, and a fixed fender or guard at the feed end of said pile, whereby the papers are supported in vertical position, of a multiple of feed catches or ledges arranged in separate and independent sets each set adapted to reciprocate and separately and independently engage the vertical edge of separate papers and slide them by successive steps from the pile; means for actuating said catches whereby the terminal catch will have a greater throw and greater speed of movement than the initial catch and means for maintaining the pile under pressure toward its feed end.

50. The combination with a holder adapted to receive a pile of papers, and a fixed fender or guard at the feed end of said pile, of feed-catches arranged in separate and independent sets each set adapted to reciprocate and separately engage the vertical edge of separate papers and slide them from the pile, and inclines arranged upon the floor of the holder, up which the papers ride and drop off into the way and for the purpose stated.

51. For feeding papers from a pile, a feed-box closed at its feed end by a fender or fence, and having a spring-pressed follower between which and the said fender, the pile of papers is supported on their folded edges, a series of inclines fixed in the bottom of the box in the line of the feed of the pile, whereby in advancing the pile over and upon the edges of the inclines the front paper will pass off the inclines at their highest edges and settle by gravity to the floor between the inclines and the fender, and means for feeding the paper edgewise out from the pile in contact with the vertical wall of the fender and the vertical ends of the said wedges.

52. For feeding papers from a pile standing on edge one by one edgewise from the pile, a feed device consisting of a box, having its feed end closed by a fender or fence formed of horizontal bars, a raceway extending from one side of said box opening therein and having its vertical walls formed of horizontal bars, catches adapted to reciprocate horizontally upon the inner vertical wall of the fender, a catch adapted for independent reciprocation horizontally within the raceway, means for independently actuating said catches whereby the papers are fed from the pile into the raceway, supported therein and slid therefrom upon their edges, and means for feeding the standing pile of papers broadside against the fender.

53. The combination, with a holder adapted to receive a pile of papers standing on their edges, a fender or fence at the feed end of said holder consisting of horizontal fixed bars 107, a carrier 111 mounted upon said fence, catches 112 standing on the inner vertical wall of said carrier, a raceway formed of vertical walls extending from the side of said holder, having its outer wall in vertical alinement with the inner wall of the fender, the other wall of the raceway forming a junction with the feed-space of said holder, a carrier 15 mounted upon ways of the raceway-wall and having a catch standing on the inner side of said raceway, means for reciprocating the said catches, the raceway-catch independently of the fender-catches, and a spring-pressed follower for feeding the pile of papers broadside into engagement with the fender-catches.

54. For feeding papers from a pile standing on edge one by one edgewise from said pile, the combination with a holder adapted to contain a pile of papers standing on edge, and a fender against which the pile of papers is fed broadside on, of a raceway opening into the holder at its side, the outer wall of the raceway being an extension crossing the path of the feed of the pile and supporting it, and a series of catches, certain of the catches movable together for engagement with separate papers within the chamber of the box, the other catch separately movable within the raceway and engaging a paper therein, whereby the papers are slid in succession upon their edges from the pile into the raceway and from the latter they are slid free from pressure one at a time.

55. The combination in a machine for sealing the free edges of papers, of mechanism for carrying, pasting, sealing and delivering the sealed paper, with a holder having a fender and a spring-pressed follower for maintaining a pile of papers standing on edge under pressure against said fender, a raceway for the paper formed vertically at the side of said holder as a prolongation of its fender, devices movable on the inner wall of the fender and devices movable on the inner wall of the raceway for feeding the papers vertically edgewise from the holder and from the raceway, and means arranged between the carrying mechanism and the raceway operated and timed to receive the paper from the raceway and deliver it to the carrying mechanism in a direction at right angles to the travel of the feeding mechanism.

56. In combination, with the endless traveling belts arranged and operating to seize, support and carry the articles to be pasted and sealed between them, of pasters arranged and timed to operate to meet in contact with and on opposite sides of the article as its edges to be sealed are carried between the pasters, and means for applying a sealing-strip to the pasted edges.

57. For sealing the free edges of folded newspapers, the combination with mechanism whereby the article to be sealed, is seized, supported and carried in the operation of sealing and delivering it, and means for advancing and severing a sealing-strip in position to be engaged by the advancing paper, of means for applying paste to the opposite sides of the edge of the paper during its advancing movement to receive the sealing-strip.

58. For sealing the free edges of folded newspapers, the combination with mechanism whereby the article to be sealed, is seized, supported and carried in the operation of sealing and delivering it and means for advancing and severing a sealing-strip in position to be engaged by the advancing paper, of mechanism whereby paste is applied to both sides of the paper at its open edges and during its advancing movement to receive the sealing-strip, the said pasting mechanism consisting of the shafts 52, 53, one above and the other below the path of the paper, and each carrying a pasting-arm arranged to revolve in the same vertical plane in advance of the strip-supplying means, the gear 59, 59 and intermediate gear connecting the power-driven shaft whereby the pasters are caused to rotate at the same speed in the direction of the travel of the paper and to meet in engagement on the opposite sides of the paper, and suitable means for supplying the pasters with paste in their movements within a space between the rear edge of one paper and the advancing edge of the next paper.

59. For feeding papers from a pile standing edgewise, the combination, with a holder adapted to contain a pile of papers standing on edge, a fence or fender against which the pile of papers is fed broadside on, and a vertical walled raceway at the side of and opening into the holder, of the carrier 111 mounted to slide upon the fender, and having the catches 112, 112, the crank connections 121, 122 for actuating said carrier, the raceway-carrier 115 having the catch 114, the separate connections for actuating the raceway-carrier and means for actuating the said crank connections whereby to operate the said independent catches.

60. In a machine for sealing papers, the combination with means for carrying, pasting, and sealing the papers, and a tilting shelf or ledge for receiving and delivering the papers to the carrying mechanism, of a vertical raceway arranged in longitudinal alinement with said shelf and adapted to receive two papers side by side on edge, a feed device of three catches two of which are adapted to engage each a separate paper and simultaneously move them side by side from the pile, the third catch movable independently of the others and having a greater stroke than the two others, whereby three papers are in movement simultaneously in their delivery one at a time upon said shelf, means for actuating the catch of greater stroke relatively with the catches of less stroke, and means for actuating the shelf, the movements of which are timed in proper sequence with the movements of the catch of greatest stroke, in the way and for the purpose stated.

61. In a device for feeding papers from a pile, a vertical raceway adapted to receive two papers side by side on edge, the combination with said raceway, of a tilting shelf arranged in longitudinal alinement with said raceway and presented to receive the paper on its edge, a feed device of three catches, two of which are adapted to engage each a separate paper and simultaneously move them from the pile, the third catch movable independently of the others within the raceway and with a greater stroke, and means for actuating the several catches in unison with the tilting of the shelf in the way and for the purpose stated.

In testimony whereof I have hereunto set my hand in the presence of two subscribing witnesses.

HERMAN T. SUNDSTROM.

Witnesses:
 H. D. CARR,
 CARRINGTON VISER.